US010133602B2

(12) United States Patent
Harris et al.

(10) Patent No.: US 10,133,602 B2
(45) Date of Patent: Nov. 20, 2018

(54) ADAPTIVE CONTENTION-AWARE THREAD PLACEMENT FOR PARALLEL RUNTIME SYSTEMS

(71) Applicant: Oracle International Corporation, Redwood City, CA (US)

(72) Inventors: Timothy L. Harris, Cambridge (GB); Alexander J. Collins, Edinburgh (GB)

(73) Assignee: Oracle International Corporation, Redwood City, CA (US)

( * ) Notice: Subject to any disclaimer, the term of this patent is extended or adjusted under 35 U.S.C. 154(b) by 13 days.

(21) Appl. No.: 14/626,754

(22) Filed: Feb. 19, 2015

(65) Prior Publication Data

US 2016/0246647 A1 Aug. 25, 2016

(51) Int. Cl.
*G06F 9/50* (2006.01)
*G06F 9/48* (2006.01)

(52) U.S. Cl.
CPC .......... *G06F 9/5027* (2013.01); *G06F 9/4856* (2013.01); *G06F 9/4887* (2013.01); *G06F 9/5083* (2013.01); *G06F 2209/501* (2013.01); *G06F 2209/508* (2013.01)

(58) Field of Classification Search
CPC ........ G06F 9/48; G06F 9/4843; G06F 9/4856; G06F 9/4881; G06F 9/505; G06F 9/50; G06F 9/5027; G06F 9/5083; G06F 9/5011; G06F 9/5016; G06F 9/5072; G06F 9/5077
See application file for complete search history.

(56) References Cited

U.S. PATENT DOCUMENTS 7,024,671 B2 * 4/2006 Yamashita ............ G06F 9/4862
  718/102
7,197,652 B2 * 3/2007 Keller, Jr. ............. G06F 1/3203
  712/E9.053

(Continued)

OTHER PUBLICATIONS

Ryan W. Moore, Predicting Application Performance for Chip Multiprocessors, 2013, University of Pittsburg, pp. 1-163.*

(Continued)

*Primary Examiner* — Abu Ghaffari
(74) *Attorney, Agent, or Firm* — Robert C. Kowert; Meyertons, Hood, Kivlin, Kowert & Goetzel, P.C.

(57) ABSTRACT

An adaptive contention-aware thread scheduler may place software threads for pairs of applications on the same socket of a multi-socket machine for execution in parallel. Initial placements may be based on profile data that characterizes the machine and its behavior when multiple applications execute on the same socket. The profile data may be collected during execution of other applications. It may identify performance counters within the cores of the processor sockets whose values are suitable for predicting whether the performance of a pair of applications will suffer when executed together on the same socket (e.g., values indicative of their demands for particular shared resources). During execution, the scheduler may examine the performance counters (or performance metrics derived therefrom) and determine different placement decisions (e.g., placing an application with high demand for resources of one type together with an application with low demand for those resources).

19 Claims, 11 Drawing Sheets

(56) References Cited

U.S. PATENT DOCUMENTS

| | | | | |
|---|---|---|---|---|
| 7,289,939 | B2* | 10/2007 | Cascaval | G06F 1/206 |
| | | | | 702/196 |
| 7,698,397 | B2* | 4/2010 | Pang | G06F 11/3409 |
| | | | | 702/182 |
| 7,861,126 | B2* | 12/2010 | Love | G06F 11/3466 |
| | | | | 377/26 |
| 7,904,894 | B2* | 3/2011 | Entin | G06F 11/3476 |
| | | | | 717/127 |
| 8,296,434 | B1* | 10/2012 | Miller | H04L 67/1029 |
| | | | | 709/226 |
| 8,635,626 | B2* | 1/2014 | Jula | G06F 9/5088 |
| | | | | 718/105 |
| 8,826,270 | B1* | 9/2014 | Lewis | G06F 9/4881 |
| | | | | 718/1 |
| 9,009,711 | B2* | 4/2015 | Wein | G06F 9/4881 |
| | | | | 345/501 |
| 9,063,782 | B2* | 6/2015 | Tennant | G06F 9/50 |
| 9,069,891 | B2* | 6/2015 | Salapura | G06F 11/348 |
| 9,280,395 | B2* | 3/2016 | Jiang | G06F 8/52 |
| 9,298,651 | B2* | 3/2016 | Heyrman | G06F 13/1689 |
| 9,501,333 | B2* | 11/2016 | Ahn | G06F 12/08 |
| 2004/0107421 | A1 | 6/2004 | VoBa et al. | |
| 2007/0043935 | A2 | 2/2007 | Kissell | |
| 2007/0074219 | A1 | 3/2007 | Ginsberg | |
| 2007/0283358 | A1* | 12/2007 | Kasahara | G06F 9/5044 |
| | | | | 718/104 |
| 2008/0059712 | A1 | 3/2008 | Fedorova | |
| 2009/0044197 | A1* | 2/2009 | Stefansson | G06F 8/314 |
| | | | | 718/106 |
| 2009/0160867 | A1 | 6/2009 | Grossman | |
| 2009/0165007 | A1 | 6/2009 | Aghajanyan | |
| 2010/0082944 | A1* | 4/2010 | Adachi | G06F 9/3836 |
| | | | | 712/200 |
| 2010/0268912 | A1* | 10/2010 | Conte | G06F 9/4856 |
| | | | | 712/20 |
| 2011/0126197 | A1* | 5/2011 | Larsen | H04L 9/3213 |
| | | | | 718/1 |
| 2011/0307890 | A1* | 12/2011 | Achilles | G06F 9/505 |
| | | | | 718/100 |
| 2012/0023505 | A1* | 1/2012 | Shin | G06F 9/4881 |
| | | | | 718/108 |
| 2012/0079235 | A1* | 3/2012 | Iyer | G06F 9/5027 |
| | | | | 712/30 |
| 2012/0180062 | A1* | 7/2012 | Sohi | G06F 9/5066 |
| | | | | 718/104 |
| 2012/0227042 | A1 | 9/2012 | Zedlewski et al. | |
| 2012/0227051 | A1* | 9/2012 | Craik | G06F 9/4881 |
| | | | | 718/104 |
| 2012/0233393 | A1 | 9/2012 | Jiang et al. | |
| 2013/0167154 | A1* | 6/2013 | Peng | G06F 9/5083 |
| | | | | 718/105 |
| 2013/0185729 | A1* | 7/2013 | Vasic | G06F 9/5072 |
| | | | | 718/104 |
| 2014/0143781 | A1 | 5/2014 | Yao | |
| 2014/0181831 | A1* | 6/2014 | Le Scouarnec | G06F 9/5066 |
| | | | | 718/104 |
| 2014/0325184 | A1* | 10/2014 | Rotem | G06F 9/30083 |
| | | | | 712/42 |
| 2015/0135185 | A1* | 5/2015 | Sirota | G06F 9/5061 |
| | | | | 718/103 |
| 2015/0186160 | A1* | 7/2015 | Arora | G06F 12/0864 |
| | | | | 713/1 |
| 2016/0092363 | A1* | 3/2016 | Wang | G06F 11/3409 |
| | | | | 711/119 |
| 2016/0359683 | A1* | 12/2016 | Bartfai-Walcott | |
| | | | | H04L 41/5009 |

OTHER PUBLICATIONS

Martin et al, Resource-Aware Task Scheduling, 2015, ACM Transactions on Embedded Computing Systems, vol. 14, No. 1, Article 5, pp. 5:1-5:25.*

Tim Harris, et al., "Callisto: Co-Scheduling Parallel Runtime Systems", EuroSys '14, 2014, pp. 1-15.

Allan Snavely, et al., "Symbiotic Jobscheduling with Priorities for a Simultaneous Multithreading Processor", ASPLOS IX, 2000, pp. 234-244, ACM, New York, NY, USA.

James R. Bulpin; et al., "Hyper-Threading Aware Process Scheduling Heuristics", Proceedings of the 2005 USENIX Annual Technical Conference, 2005, pp. 399-402, USENIX Association, Berkeley, CA, USA.

Rob Knauerhase; et al., "Using OS observations to improve performance in multicore systems", IEEE Micro, 28(3), May 2008, pp. 54-66.

Yuejian Xie, et al., "Dynamic classification of program memory behaviors in CMPs", Proceedings of CMP-MSI, Jun. 2008, pp. 1-9.

Sergey Zhuravlev; et al., "Addressing Shared Resource Contention in Multicore Processors via Scheduling", In the proceedings of the Fifteenth Edition of ASPLOS on Architectural Support for Programming Languages and Operating Systems, 2010, pp. 129-142, New York, NY, USA.

Lingjia Tang, et al., "The Impact of Memory Subsystem Resource Sharing on Datacenter Applications", In Proceedings of the 38th Annual International Symposium on Computer Architecture, ISCA '11, 2011, pp. 283-294, ACM, New York, NY, USA.

Simone Libutti, et al., "Exploiting Performance Counters for Energy Efficient Co-Scheduling of Mixed Workloads on Multi-Core Platforms", In Proceedings of Workshop on Parallel Programming and Run-Time Management Techniques for Many-core Architectures and Design Tools and Architectures for Multicore Embedded Computing Platforms, PARMA-DITAM '14, 2014, pp. 27:27-27:32, ACM, New York, NY USA.

Malte Schwarzkopf, et al., "Omega: flexible, scalable schedulers for large compute clusters", In EuroSys '13: Proc. 8th European Conference on Computer Systems, Apr. 2013, pp. 351-364.

Thomas Anderson, et al., "Scheduler activations: Effective kernel support for the user-level management of parallelism", ACM Transactions on Computer Systems (TOCS), vol. 10, No. 1, Feb. 1992, pp. 53-79.

Juan A. Colmenares; et al., "Tessellation: refactoring the OS around explicit resource containers with continuous adaptation", In DAC '13: Proc. 50th Annual Design Automation Conference, Jun. 2013, pp. 76:1-76:10.

Robert L. McGregor; et al., "Scheduling Algorithms for Effective Thread Pairing on Hybrid Multiprocessors", In Proceedings of the 19th IEEE International Parallel and Distributed Processing Symposium (IPDPS), 2005, pp. 1-10, Los Alamito, CA, USA.

Mohammad Banikazemi; et al., "Pam: A novel performance/power aware meta-scheduler for multi-core systems", In Proceedings of the 2008 ACM/IEEE Conference on Supercomputing, SC '08, Nov. 15-21, 2008, pp. 1-12, Piscataway, NJ, USA.

* cited by examiner

ADAPTIVE CONTENTION-AWARE THREAD PLACEMENT FOR PARALLEL RUNTIME SYSTEMS

BACKGROUND

Field of the Disclosure

This disclosure relates generally to parallel computing, and more particularly to systems and methods for adaptive contention-aware co-scheduling of hardware contexts for parallel runtime systems on high-utilization shared machines.

Description of the Related Art

Traditionally, parallelism has been exploited in high performance computing (HPC) and multi-threaded servers in which jobs are often run on dedicated machines, or on fixed sets of cores (or hardware contexts) in a shared machine. Traditional HPC jobs have long, stable CPU-bound phases with fixed resource requirements. Traditional servers exploit the ability to process independent requests in parallel. There is often little parallelism within each request. This style of synchronization lets traditional servers run well on current operating systems.

As parallelism is becoming more ubiquitous, there is less programmer effort put into tuning software to run on a particular parallel machine, since there are more different types of machines capable of executing parallel workloads, and the differences between them make it difficult (if not impossible) to tune applications for each one. In addition, many emerging parallel workloads exhibit CPU demands that vary over time. For example, in graph analytic jobs, the degree of parallelism can both vary over time and depend on the structure of the input graph. Other examples include cases in which parallelism is used to accelerate parts of an interactive application (occurring in bursts in response to user input). Current operating systems and runtime systems do not perform well for these types of workloads (e.g., those with variable CPU demands and frequent synchronization between parallel threads). Typical solutions attempt to avoid interference between jobs either by over provisioning machines, or by manually pinning different jobs to different cores/contexts.

Software is increasingly written to run on multi-processor machines (e.g., those with multiple single-core processors and/or those with one or more multi-core processors). In order to make good use of the underlying hardware, customers want to run multiple workloads on the same machine at the same time (i.e. on the same hardware), rather than dedicating a single machine to a respective single workload. In addition, many parallel workloads are now large enough that a single workload can individually scale to use an entire machine; malleable (meaning, for example, that workloads can run over a varying number of hardware contexts, using abstractions such as multi-processing APIs to dynamically schedule loops rather than explicitly creating threads themselves); and/or "bursty" (meaning, for example, that their CPU demand can vary within a single execution, such as with a mix of memory-intensive and/or CPU-intensive phases, and other less resource-intensive phases). Much of the current work in thread placement involves single-threaded programs, and many of the solutions require modified hardware.

SUMMARY

In various embodiments, the systems described herein may implement dynamic co-scheduling of hardware contexts when executing multiple parallel applications. In some embodiments, an adaptive contention-aware thread scheduler may place software threads for pairs of applications on the same socket of a multi-socket machine for execution in parallel. Following an initial thread placement for a given application (e.g., during execution of the pair of applications together on a single socket), performance counter data may be collected and may be used to modify the initial thread placement decisions.

In various embodiments, the initial thread placements may be made based on any of a variety of heuristics that are suitable for informing such placements. In other embodiments, the initial thread placements may be based, at least in part, on profile data that characterizes the machine (rather than the applications themselves) and its behavior when multiple applications execute on the same socket. For example, profile data that characterizes the machine may be collected during the execution of other applications (e.g., benchmark applications) in isolation on the machine and/or in pairs, in different embodiments. This profile data may identify performance counters within the cores of the processor sockets whose values are suitable for use in predicting whether the performance of a pair of applications will suffer when they are executed together on the same socket (e.g., performance counters whose values are indicative of the demands by executing applications for particular shared resources).

During execution, an adaptive contention-aware thread scheduler (which may be a thread of one of the executing applications executing on the multi-socket machine, a component of an operating system executing on the multi-socket machine, or a component of a resource-management-enabled parallel runtime system executing on the multi-socket machine, in different embodiments) may examine the values of performance counters within the processor cores of a single socket on which multiple application are executing that have been determined to be "contention-significant" (or performance metrics derived therefrom) and may determine different placement decisions for those applications. For example, if an initial scheduling decision placed the software threads of two applications, each having relatively high demand for shared resources of a given type, on the same socket, a subsequent placement decision may move one of the applications to a socket on the machine on which an application with a much lower demand for resources of the given type is executing. The performance counters within the processor cores that are contention-significant may be machine dependent. In some embodiments, they may include performance counters whose values are indicative of a demand for memory resources (e.g., they may represent a cache miss rate or the rate at which load instructions are attempted).

In some embodiments, the multi-socket machine may implement a resource management layer between the operating system and one or more parallel runtime systems that have been modified to work with components of the resource management layer. The resource management components and resource-management-enabled parallel runtime systems may be configured to work together to use the hardware contexts of the machine efficiently, while reducing load imbalances between multiple parallel applications and avoiding the preempting of threads at inconvenient times.

Figure 1:
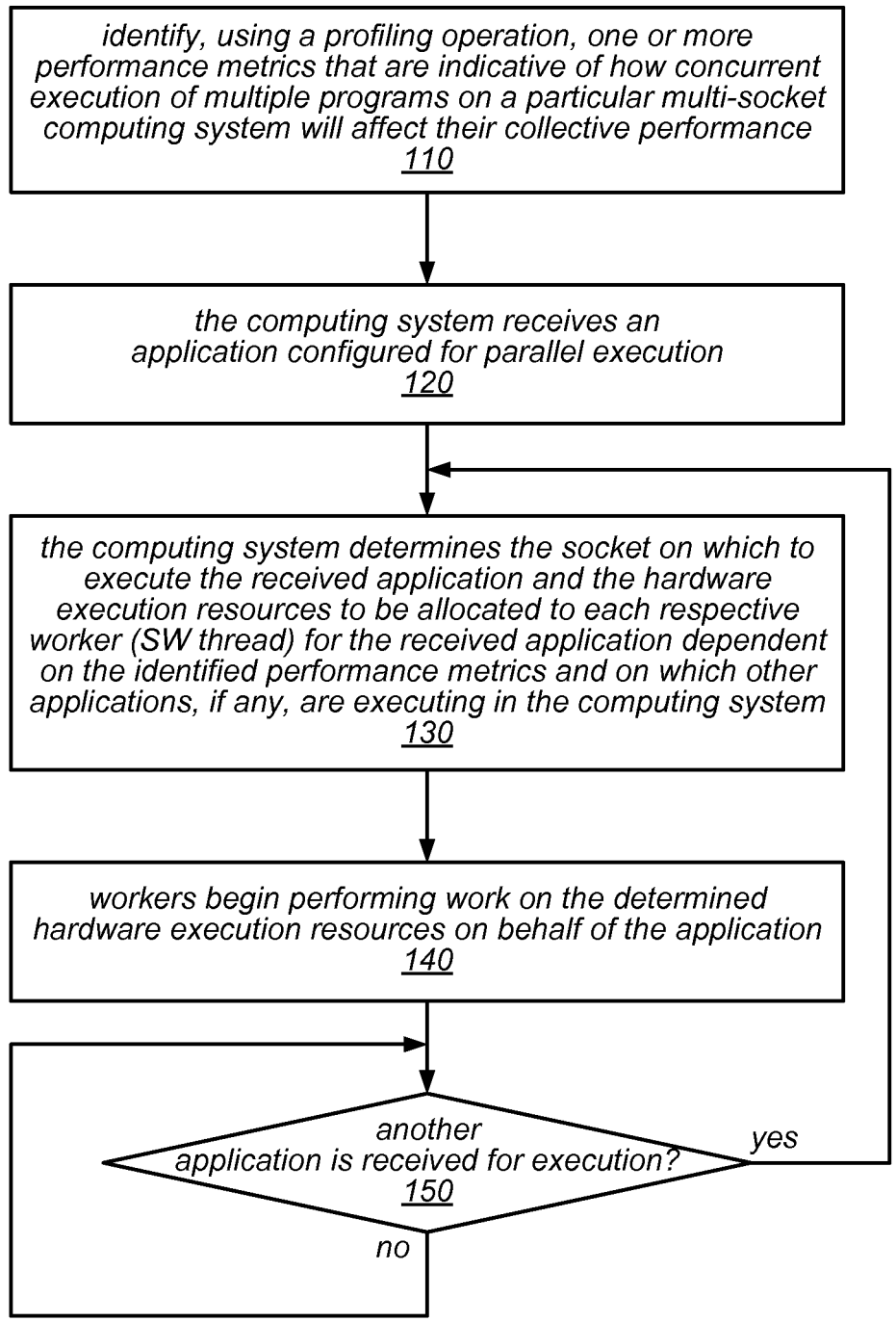
FIG. 1 is a flow diagram illustrating one embodiment of a method for performing adaptive contention-aware thread placement.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, software is increasingly written to run on multi-processor machines. Trends in this area include the need to make effective use of multi-core hardware (leading to increasing use of parallelism within software), the desire to use hardware efficiently (leading to greater co-location of workloads on the same machine), and the expectation that parallel applications should "just work" without needing to perform careful tuning that is directed to any specific hardware. For example, running multiple parallel programs on multi-socket multi-core machines is becoming increasingly common in data analytics, and in general-purpose server and desktop workloads. Compared with many traditional scientific problems, these workloads exhibit "burstier" behavior and are rarely tuned to specific hardware. Consequently, there is an increasing desire for parallel runtime systems and schedulers to consider the structure of the machine alongside the dynamic behavior of workloads. These trends make it important for systems to be able to handle running multiple parallel workloads on the same machine (and for the workloads to behave and perform well when doing so) without programmers needing to tune their applications specifically for a given machine or for the workload or combination of workloads that is running.

Note that for different processor architectures, different terminology may be used to describe the hardware execution resources. For example, they may be referred to as "hardware contexts," "hardware strands", "hardware threads", "processor cores", or simply "cores", in different cases, and multiple ones of these hardware execution resources may be included in a single processor socket. These terms may be used somewhat interchangeably in the descriptions that follow, such that techniques described herein as being applicable in systems in which the hardware execution resources are referred to using one of these terms may also be applicable in systems in which the hardware execution resources are referred to using another one of these terms, or using another term that describes the hardware execution resources of a machine that is capable of executing parallel workloads. Note also that the techniques described herein may be applied at different granularities, e.g., for scheduling complete processors, for scheduling cores within those processors (each of which may include comprising multiple hardware contexts), or for scheduling individual hardware contexts.

As noted above, in order to make good use of hardware, customers may want to run multiple workloads on the same multi-core machine at the same time, rather than dedicating a single machine to a single workload. Typical approaches that are applied by existing systems include attempting to avoid interference between jobs by over-provisioning machines or by manually pinning each of the jobs to a different core. In some existing systems, the operating system may apply heuristics such as "all threads from the same application will be run on the same socket". For example, if there are four applications running in a machine that includes two sockets, the operating system might just place two applications on each socket. In some cases, such an approach can waste resources by leaving resources allocated to one job idle if that job is not able to make use of them. In other cases, such an approach can limit the performance of jobs by denying a job the ability to use resources that would otherwise be idle in the machine. In these and other existing systems, the performance of an individual application may vary greatly depending on which, if any, other applications are executed on the same hardware execution resources or on hardware execution resources of the same processor socket. For example, the performance of a given application may suffer (compared to its performance when executed in isolation) due to contention for shared resources (e.g., CPU cycles, bandwidth to main memory, or cache space) when the given application and another application executing on resources of the same socket both exhibit high utilization of those shared resources.

The techniques described herein may be suitable for use in executing a dynamically changing mix of these types of parallel programs (e.g., those that potentially compete for shared resources) on a multi-socket shared-memory machine, and making runtime decisions about which of the programs' threads should be co-located on a single socket. For example, the systems described herein may, in various embodiments, employ contention-aware spatial scheduling mechanisms for selecting which parallel applications should run on the same socket in a multi-socket system. These mechanisms may operate dynamically, e.g., adapting the assignments of applications (and software threads thereof) to hardware execution resources based on the values of various hardware performance counters that are available on the hardware execution resources. In some embodiments, these mechanisms may not require separate workload characterization runs and/or they may accommodate a dynamically changing mix of applications, including those with phase changes.

The scheduling mechanisms described herein were evaluated using benchmark programs from the Standard Performance Evaluation Corporation (from the SPEC OMP® benchmark suite), two recent graph analytics projects, and a pair of micro-benchmarks. As part of the evaluations, the Average Normalized Turnaround Time (ANTT) and System Throughput (STP) were measured for a variety of program combinations. These system-wide metrics, in combination, provide a measure of the responsiveness of the system and the rate at which it completes work. The performance of the techniques described herein was compared with that of a standard Linux scheduler, and that of an initial version of a framework that includes a resource management layer between the runtime system and the system-wide scheduler of the operating system and which is sometimes referred to herein as "Callisto". Averaged across a suite of program combinations, the systems that employed the adaptive scheduling mechanisms described herein achieved an Average Normalized Turnaround Time (ANTT) of 1.08 and a System Throughput (STP) of 4.7, which represent 20% and 37% improvements, respectively, over the OpenMP® runtime system (libgomp) that is typically included with the GNU compiler collection (GCC). A profile-driven variant of these contention-aware spatial scheduling techniques achieved an ANTT of 1.05, which is similar to that of the adaptive contention-aware scheduler, but exhibited a lower throughput than the adaptive scheduler, with an STP of 3.99.

The adaptive contention-aware spatial scheduling techniques described herein are further illustrated below by way of an example implementation that builds on recent work involving an execution framework that includes a resource management layer between a resource-management-enabled runtime system and the system-wide scheduler of the operating system (Callisto). This user-mode framework has been shown to be useful for prototyping schedulers and exploring the interaction between system-wide schedulers and the runtime systems in individual programs. For example, it has been shown to reduce scheduler-related interference between sets of programs running together by reducing lock-holder pre-emption problems, by reducing load imbalances between worker threads within a program, and by making explicit thread-to-core allocations that adapt in response to the amount of parallelism available within a program. The techniques employed in this example system have been shown to achieve good utilization in the presence of bursty workloads. For example, it has been demonstrated that most scheduler-related interference between pairs of workloads on a two-socket machine may be avoided using the techniques employed in this example system.

The adaptive contention-aware spatial scheduling techniques described herein may, in various embodiments, be used to schedule more than two programs on a shared machine and, in particular, to select which sets of programs from among more than two programs should be placed together on the same socket. In some embodiments, these techniques may be used to allocate hardware execution resources to software threads of two of more applications dependent on the characteristics of the workloads and/or on the underlying machine architecture. For example, the allocation of hardware execution resources to applications (or to software threads thereof) may be dependent on whether and/or how those applications (or software threads) will utilize and/or compete for shared CPU cycles or other shared resources (e.g., bandwidth to main memory, cache space, etc.). In some embodiments, the systems described herein may employ these adaptive contention-aware spatial scheduling techniques when deciding which applications or sets of applications should be scheduled for execution on the same sockets (e.g., when there is expected to be little competition for shared resources among the applications executing on a particular socket) and which applications or sets of applications should be scheduled for execution on different sockets (e.g., when there is expected to be more competition for shared resources among the applications).

In some embodiments, the scheduling decisions may be made manually based on information that was previously collected. In other embodiments, these decisions may be made in an automated way (e.g., programmatically and without human intervention), while exploiting information that is gathered in one or more of the following ways: 1) by performing profiling operations on each of the applications in isolation and subsequently using the resulting profile information to determine (at runtime) which applications (or software threads thereof) should be directed to which sockets and/or 2) by performing dynamic system monitoring while executing one or more of the applications and (at that time) determining which applications (or software threads thereof) should be directed to which sockets. With the latter approach, the allocation of hardware execution resources to particular applications (or software threads thereof) may be changed during execution in response to changes in the behavior of one or more of the applications (e.g., changes with respect to resource usage or other performance-related characteristics).

In some embodiments, both of the approaches described above may be applied. In such embodiments, profiling information that was collected when an application was executed in isolation may be used to make an initial hardware execution resource allocation decision for that application (and/or other applications executing concurrently in the same multi-socket system), but the hardware execution resource allocations may be subsequently changed during execution based on dynamic system monitoring. For example, in one embodiment, after initial hardware execution resource allocations have been made for two or more applications (e.g., using profiling information collected when the applications were executed in isolation, as that described herein), the applications may be allowed to run for some pre-determined period of time (e.g., a few seconds or minutes) before dynamic system monitoring is performed. At the end of the pre-determined period, decisions may be made about whether and/or how replacement hardware execution resource allocation decisions should be made periodically (e.g., once every second or every few seconds)

based on dynamic system monitoring. In another embodiment, after initial hardware execution resource allocations have been made for two or more applications (e.g., randomly or using simple heuristics, as in some existing systems), the applications may be allowed to run for some pre-determined period of time (e.g., a few seconds or minutes) before dynamic system monitoring is performed. In other words, in some embodiments, the system may not expend much, if any, effort on determining a suitable initial hardware execution resource allocation for an application, but may instead rely on the application of dynamic system monitoring to quickly correct any unsuitable initial placements.

As described herein, it has been demonstrated that different program-to-core mappings (in different combinations) may affect the performance of those programs differently, as evidenced by measuring the performance degradation caused by ignoring the presence of separate sockets. In some embodiments, the systems described herein may employ a predictive technique for choosing program combinations that minimize interference and resource contention in a multi-socket environment. For example, in some embodiments, they may be used to profile the entire machine a priori, allowing it to optimize unseen programs without the need for additional profiling steps. This may provide an advantage over previous approaches that require per-application profiling, and may include the use of a methodical approach to choose appropriate performance counters to perform the performance prediction.

As described in more detail herein, three alternative implementations of the contention-aware spatial scheduling techniques were evaluated: (i) a fixed-oracle version, which selects the best program-to-socket mapping for a given workload based on trying each combination, (ii) a fixed-profile version, which selects the program-to-socket mapping based on per-program solo-run profiling (i.e., per-program profiling in isolation), and (iii) an adaptive version, which selects the best program-to-socket mapping dynamically, without the need for profiling, and which is able to respond to phase changes within a program's run. The second and third of these scheduling approaches (in which the user-mode framework described above was extended using a predictive technique to include a profile driven scheduler and an online adaptive scheduler, respectively) were also compared to an unmodified version of the framework and the OpenMP runtime system (libgomp). As previously noted, these contention-aware spatial scheduling techniques demonstrated significant improvement in system throughput when compared with these existing approaches, with no corresponding decrease in average normalized turnaround time.

One embodiment of a method for performing contention-aware thread placement is illustrated by the flow diagram in FIG. 1. As illustrated at 110, in this example, the method may include identifying, e.g., using a profiling operation, one or more performance metrics that are indicative of how concurrent execution of multiple programs on a particular multi-socket computing system will affect their collective performance. The method may also include, subsequent to profiling the computing system, the computing system receiving an application that is configured for parallel execution, as in 120.

As illustrated in this example, the method may include the computing system determining the socket on which to execute the received application and the hardware execution resources (e.g., cores) to be allocated to each respective worker (e.g., each software thread) for the received application dependent on the identified performance metrics and on which other applications, if any, are currently executing in the computing system, as in 130. As described herein, this determination may, in some embodiments, be dependent on a characterization of the received application based on having previously profiled the received application with respect to the identified performance metrics (e.g., in isolation) or having profiled a given set of applications (e.g., one that includes the received application and one or more other application executing on shared resources). In other embodiments, such a determination may be made dynamically, e.g., after making an initial allocation of hardware execution resources to the received application and then observing the values of the identified performance metrics for a pre-determined time period. The method may then include the workers beginning to perform work on the determined hardware execution resources on behalf of the application, as in 140.

As illustrated in this example, until any additional applications are received by the computing system for execution, the computing system may not make any changes to the allocation of sockets and/or hardware execution resources for the application currently executing in the computing system. This is illustrated in FIG. 1 by the feedback from the negative exit of 150 to its input. However, when and if another application is received for execution, some or all of the operations illustrated in FIG. 1 may be repeated for the other application. For example, the computing system may determine the socket and hardware execution resources to be allocated to the other application based, at least in part, on performance metrics and any applications currently executing in the computing system, and workers beginning to perform work on behalf of the other application. This is illustrated in FIG. 1 by the feedback from the positive exit of 150 to 130. Note that, as described below, in some embodiments, changes to the sockets on which various application execute and/or the particular hardware execution resources allocated to their worker threads may be made during execution of those applications.

The techniques described herein for performing adaptive contention-aware thread placement may be applied in different systems and under different circumstances, in different embodiments. Situations in which the application of these techniques may improve the performance of applications executing on multi-socket machines may be further illustrated by way of the following experiment. In this experiment, performance was measured for four randomly chosen benchmark programs (which included one graph analytics program) running concurrently on a multi-socket machine using different runtime systems and program-to-socket mappings for five different variants of the resulting workload. More specifically, the programs were run concurrently on a dual-socket machine with at least five repeats (e.g., to ensure that there were four programs running at all times). Two system-wide performance metrics described above (Average Normalized Turnaround Time, or ANTT, and System Throughput, or STP) were measured in these experiments to determine the effectiveness of the scheduling techniques. Note that ANTT may represent a measure of the perceived slow-down of each program compared to running it in isolation on the entire machine, averaged over all programs. Therefore, a lower value indicates better (higher) performance for that set of programs. For example, a value of 1 may indicate that running the program alongside other workloads does not results in slow-down in its performance. However, due to resource sharing between programs the system is unlikely to achieve this. On the other hand, for STP, which is a measure of the job completion rate of the entire system (e.g., a measure of the rate at which the system completes work), a higher value indicates better (higher) performance. Note also that some techniques may result in improved values for one of these measures, but not the other, while other techniques may result in improved values for both of these measures.

For the purposes of the profiling exercises described herein, ANTT was computed as:

$$ANTT = \frac{1}{n}\sum_i \frac{T_i^M}{T_i^S}$$

For the purposes of the profiling exercises described herein, STP was computed as:

$$STP = \sum_i \frac{T_i^S}{T_i^M}$$

In both of these equations, $T_i^S$ represents the execution time of each program when it is run in isolation, and $T_i^M$ represents the execution time of each program when it is run alongside one or more other programs.

Ideally, with four programs, one might hope to achieve an ANTT of at most 1 and an STP of at least 4, which would be the result if the machine were statically partitioned between the four programs, and there was no contention between them (i.e., where $T_i^M = T_i^S$). Note that it may be possible achieve an ANTT less than one and an STP greater than 4, e.g., if overlapping the execution of two programs hides the performance penalty of blocking for synchronization. In practice, however, poorer results may be observed when contention is significant, whereas better results may be achieved when bursty workloads interact well (e.g., by overlapping the execution of different programs in such a way as to hide blocking for I/O or synchronization). The five variants of the workload whose results were compared included a libgomp OpenMP runtime implementation that used passive synchronization, sixteen OpenMP threads, and ran on a default Linux scheduler. They also included an unmodified implementation of the execution framework described above that used sixteen OpenMP threads for each program, and that multiplexed these over the four (on average) cores that each program received. Note that in this variant, the sets of four cores were generally in the same socket, but there was no method to specifically control which program received which set of cores (which may vary over time as programs start and complete). In this variant, if one program was not able to use all of its hardware contexts, the framework was configured to make them available to other programs. For example, while the graph analytics benchmark was loading its input graph, the other benchmarks were provided with additional cores.

For the remaining three variants of the workload, the execution framework described above was modified to implement three different static program-to-socket mappings. In other words, in each of the three variants, each program was fixed to a specific quarter of the machine (i.e., with two programs fixed to the same socket). For example, in one variant, benchmark programs A and B were placed together on the same socket and programs C and D were placed together on another socket. In another variant, benchmark programs A and C were placed together on the same socket and programs B and D were placed together on another socket. In yet another variant, benchmark programs A and D were placed together on the same socket and programs B and C were placed together on another socket. Note that, in these experiments, programs A, B, and C were the "apsi", "art", and "bwaves" programs of the SPEC OMP 2012 benchmark suite, respectively, and program D was a graph analytics program called "hop_dist".

The results of this experiment demonstrated that the choice of program-to-socket mapping can have a significant impact on the system with respect to both ANTT and STP. For example, the unmodified execution framework achieved better ANTT than the libgomp OpenMP runtime implementation, which may be expected given that the framework attempts to reduce interference between programs. Note, however, that interference was reduced further in the modified versions of the framework by partitioning programs within separate sockets. This was demonstrated by the improved ANTT and STP metrics that were achieved by at least one of the configurations that implemented static program-to-socket mappings (specifically, the AC-BD mapping). Moreover, the choice of pairings of programs was shown to have a significant effect on performance. For example, the ANTT and STP metrics varied dramatically amongst the three configurations that implemented static program-to-socket mappings, with the AC-BD mapping achieving much better ANTT and STP when compared to the other two mappings. These differences in performance illustrate that a scheduling approach that can automate the mapping from programs to sockets, such as those described above, may significantly improve overall system performance when programs run concurrently on multi-socket machines. Note that the profile driven scheduling approaches described herein may use program behavior information from hardware counters to select the highest performance configuration (the AC-BD mapping). The adaptive online scheduler may further improve performance by adjusting the scheduling (i.e., the mappings between programs and sockets) whenever a phase change in program behavior occurs.

In some embodiments of the multi-socket machines described herein, it may be possible to predict whether pairs of programs will behave well when sharing the same socket or whether the programs will experience significant performance degradation due to competition for shared resources on the socket. For example, in some embodiments, the techniques described herein may be used to profile the multi-socket machines themselves to determine which performance measures (or combinations of performance measures) can be used to predict which pairings will perform well and which will lead to a significant loss in performance for one or both of the programs (i.e. which performance counters, or combinations thereof, yield contention-significant performance metrics).

An experiment has been conducted to compare the performance when running pairs of programs on the same socket to their performance when running them on distinct sockets of a 16-core, dual-socket machine. Each benchmark was run using four threads, pinned to either four distinct cores on different sockets, or four distinct cores on the same socket. This setup ensured that the programs had the same amount of compute resources in each case and that each thread had exclusive use of a core. Therefore, any change in performance can be attributable to thread placement. Note also that this experiment was run using the standard libgomp implementation, without the temporal scheduling feature of the user-mode execution framework described above.

These results of this experiment demonstrated that there is a significant performance penalty associated with executing a program on the same socket as another program. For example, for about half of the program combinations there was an increase in execution time of 20%, with a maximum increase of 50%. For the other half of the program combinations there was minimal impact due to sharing sockets. In a few rare cases, there was actually an increase in program performance. For example, in two cases there was a 1.4× increase in performance when a particular pair of programs shared a socket. These results indicate that a smarter scheduling approach, such as that described herein, may be used to avoid program slowdown by carefully choosing which programs should (and should not) share the same socket.

Note that there were some applications that were amenable to sharing a socket no matter which other applications they were paired with. For example, there was one program (referred to herein as "M") that did not experience or cause a slow-down when paired with any other the other programs. In contrast, another program (referred to herein as "S") adversely affected the performance of most of the programs with which it was paired (e.g., other than the aforementioned "M"). Therefore, these two applications appear to be good candidates to be co-located on the same socket, to improve overall system performance. In at least some embodiments, the profile-based and online adaptive scheduling approaches described herein may rely on being able to predict the performance of running a pair of programs on the same socket, as compared to running them on different sockets. More specifically, these approaches may be dependent on a predictive model that maps the properties of the pairs of programs (e.g., properties provided by various hardware performance counters and/or other properties) to a performance estimate.

Modern CPU architectures provide many hardware performance counters, typically in the form of a set of dedicated hardware registers that are incremented by the control logic of the CPU itself. These can be used to record events on a per-thread basis, with low overhead and very little (if any) impact on the behavior of the program. In various embodiments, such performance counters may record events such as the number of cache misses experienced at different levels of the hierarchy and/or the number of completed instructions that are executed, among others. In general, these counters may provide a measure of the behavior of programs that can be used as program features to build the predictive model. The specific events for which measurements are available through a performance counter may be dependent on the underlying hardware. In some embodiments, the systems described herein may employ a performance-focused API library to set up and retrieve measurements from the various hardware counters of an execution platform.

Some previous approaches to co-scheduling programs for execution on a multi-socket machine rely on running those particular programs in different combinations on the machine to see which ones interferes with which other ones. In other words, for these approaches, the workload must be known ahead of time, and each of the programs may be profiled first in isolation, and then in all possible combinations. In various embodiments, the systems described herein may, instead, profile a collection of different applications (each in isolation) to determine which of the machine's performance counters are significant in determining the likelihood of interference between applications (on that machine), and may use that information dynamically when profiling other applications (in isolation) to determine their suitability for execution on the same socket in various combinations (e.g., without having to know the workload ahead of time). In other words, these techniques may first be used to profile or characterize the multi-socket machine (e.g., to determine which of the available performance measurements recorded by the counters in the machine provide an indication of whether a given program can be run on the same socket as another program without a significant loss of performance), rather than any specific application or their workloads. After profiling the machine, the resulting profiling information for the machine may be used to determine which collections of programs to run on the same socket and which to run on different sockets. Note, however, that in some embodiments, programs (or threads thereof) may initially be scheduled for execution on particular sockets using a random scheduling technique or using various heuristics, but the initial scheduling decisions may (after observing the values of the significant performance counters during execution) be replaced with a different scheduling decision that improves overall performance of the programs on that machine.

Figure 2:
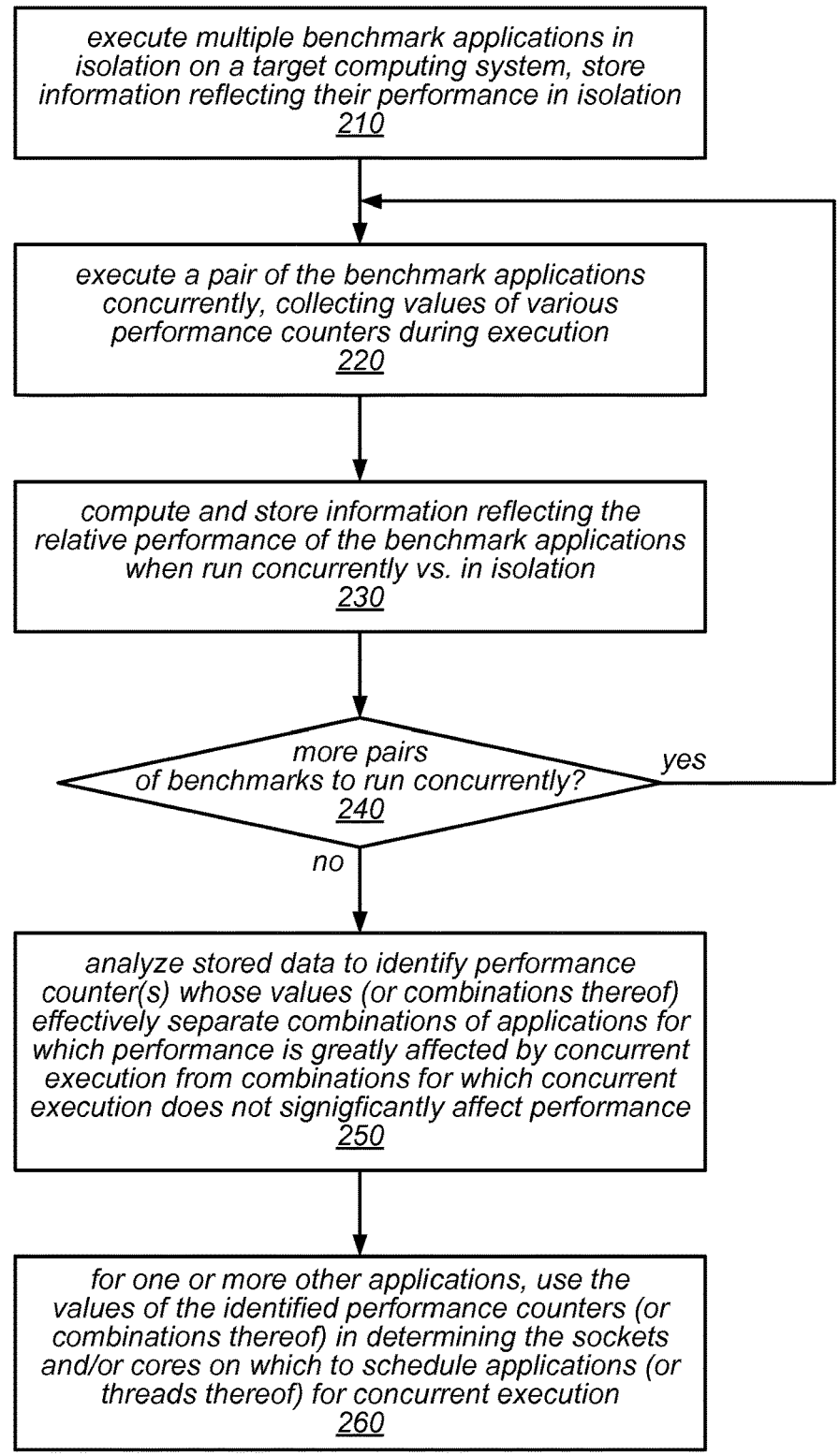
FIG. 2 is a flow diagram illustrating one embodiment of a method for identifying contention-significant performance metrics that may be subsequently used to predict whether or not the performance of applications (in various combinations of applications) will be negatively affected by their concurrent execution on shared resources.

One embodiment of a method for identifying contention-significant performance metrics that may be subsequently used to predict whether or not the performance of applications (in various combinations of applications) will be negatively affected by their concurrent execution on shared resources is illustrated by the flow diagram in FIG. 2. As illustrated at 210, in this example, the method may include executing multiple benchmark applications in isolation on a target computing system (e.g., one at a time), and (e.g., during execution) storing information reflecting their performance when they are executed in isolation, as in 210. The method may also include executing a pair of the benchmark applications concurrently, and collecting values of various performance counters (for each of the benchmark applications) during execution, as in 220. The method may include computing and storing information reflecting the relative performance of the benchmark applications when they are run concurrently vs. when they are executed in isolation, as in 230. As illustrated in this example, while there are additional potentially significant pairs of benchmark applications to be run concurrently, shown as the positive exit from 240, the operations illustrated in 220 and 230 may be repeated for each additional pair of benchmark applications. This is illustrated in FIG. 2 by the feedback from the positive exit of 240 to 220.

As illustrated in this example, once all potentially significant pairs of benchmark applications have been run concurrently, shown as the negative exit from 240, the method may include analyzing the data that was stored while the pairs of benchmark applications were executed to identify one or more performance counters whose values (or combinations thereof) may be used to effectively separate combinations of applications for which performance is greatly degraded by concurrent execution from combinations of applications for which concurrent execution does not appear to significantly affect performance, as in 250.

As illustrated in this example, subsequent to determining the performance counters (or combinations thereof) whose values may be used to effectively separate combinations of applications for which performance is greatly affected by concurrent execution from combinations of applications for which concurrent execution does not appear to significantly affect performance, the method may include, for one or more other applications, using the values of the identified contention-significant performance counters (or combinations thereof) in determining the sockets and/or cores on which to schedule applications (or software threads thereof) for concurrent execution, as in 260. In other words, the method may include profiling the multi-socket computing system itself, rather than just profiling specific workloads, to determine what information can be used to more effectively determine which programs (and software threads thereof) can be scheduled for execution on the same sockets without a significant loss of performance. Note that, while FIG. 2 illustrates an example in which the values of various performance counters are collected (for each of the benchmark applications) when pairs of the benchmark applications are executed, in other embodiments, the values of various performance counters may be collected when the benchmark applications are executed in isolation instead of, or in addition to, when they are executed in pairs.

In general, the results of the machine profiling exercises described herein indicated that (at least for the multi-socket machines used in these exercises) performance measurements (and combinations thereof) that are related to memory accesses and contention for memory resources may be used to separate pairs of applications that can be executed on the same socket without incurring a significant loss in performance from pairs of applications that cannot be executed on the same socket without incurring a significant loss in performance. In some embodiments, the contention-significant performance counters may include those that indicate contention for space in a cache that is shared between two applications executing on the same socket. For example, if two applications that each require a lot of space in the cache are placed on cores in the same socket that share a cache, this may lead to poor performance. However, placing applications of different types (e.g., one of which requires a lot of cache space and another of which does not) together on cores in the same socket that share a cache may work well (e.g., one may consume the majority of the cache resources, but this may not adversely affect the performance of the other). In this example, various cache space metrics that are exposed to applications by the processors (e.g., the cache miss rate) may be collected during a profiling operation of each of these applications and of other applications (e.g., in insolation) and these applications may be selected for execution on the same socket because they exhibit complementary behavior with respect to cache miss rates. In other words, an application that exhibits a high cache miss rate when executed in isolation is likely to benefit from being paired with one that exhibits a low cache miss rate.

In some embodiments, the contention-significant performance counters whose values may be well-suited for determining which applications (and software threads thereof) can be placed on the same socket may include one whose value indicates (or is dependent on) the rate at which the applications are loading data from memory (e.g., one that indicates the total number of instructions that are loading data from memory over time, without regard for the likelihood of hitting or missing in the caches). For example, there are costs associated with loading data from memory, even in the case of a cache hit. Similarly, in the case of a cache miss, there are costs associated with contention in the memory system (e.g., due to queuing requests in the memory controller, etc.). In this example, a performance counter value (or composite performance metric) that indicates the number of memory loads that are attempted by an application per second (i.e., the demand, rather than the latency or response time) may be used to select applications to be placed on the same socket (e.g., pairs of applications that exhibit complementary behavior with respect to the rate at which memory loads are attempted).

As noted above, a modern processor may include dozens or hundreds of performance counters. Therefore, in some embodiments, a principal component analysis may be performed on samples of the data recorded by those performance counters to attempt to reduce the number of performance counters to be used in profiling the machine. In such embodiments, the principal component analysis may be used to identify which combinations of performance counters are most significant, e.g., by determining which performance counters collect values that are tightly correlated and using an aggregate value (which may include different weightings on different performance counter values) to represent that collection of performance counters rather than using the raw performance counter values for each of them individually. In another embodiments, another mechanism for performing dimensionality reduction may be applied to identify the most signification performance counters. In some embodiments, after identifying the most significant performance counters, an automated technique may be applied to identify correlations between the values collected by those performance counters and the speedups or slowdowns exhibited by various applications executing on a given machine. For example, a Spearman's rank coefficient technique may be used to which produce a value that indicates how well correlated a given combination of performance counter values is with the speedups/slowdowns on the given machine.

By applying the machine profiling techniques described herein, it was demonstrated that (for at least the machine used in these experiments) the difference in the rate of memory load instructions was well correlated with the relative slowdown for a pair of applications when they were run together rather than sequentially on the machine. For example, when there was a very big difference between the load instruction rates for two applications (e.g., when one application exhibits a high load instruction rate and the other application exhibits a low load instruction rate), any slowdown due to running the two applications on the same socket were minimal. Conversely, when there was a smaller difference in load instruction rates between a pair of applications, there was a significant slowdown due to running the two applications on the same socket. In other words, these results demonstrated that the average slowdown due to running two applications on the same socket may be greatly reduced by selecting applications for which the difference in the load instruction rates is maximized. Therefore, in this example, it was determined that the load instruction rate may be effective in separating the combinations that worked well together from the combinations that did not work well together.

In some embodiments, the approach described above may be used to devise a heuristic for predicting which pairs of programs will cooperate more effectively when they are executed on the same socket and/or which pairs of programs will suffer performance degradation when they are executed on the same socket. For example, after various contention-significant performance counters (or performance metrics that are based on or derived from their values) have been identified, and given a set of programs to execute on a multi-socket machine, each with a given load instruction rate, a mapping of programs to sockets may be chosen such that the absolute difference in the performance metrics or performance counter values (e.g., the absolute difference in the instruction rates of the programs place on each socket) between pairs of applications executing on the same socket is maximized. Note that, in order to determine which performance counter values and/or aggregate performance metrics are contention-significant, an operation to profile the machine may collect performance counter data during execution of a representative mix of workloads and may identify which performance counters can be used to separate the clusters of data points in order to predict which combination will perform well. This heuristic may then be used in making thread placement decisions for any programs (including previously unseen programs) without necessarily needing to perform a program-specific profiling step. In other words, this approach may be used to profile the machine, and not the individual programs that execute on them.

As noted above, it has been found that (for at least some multi-socket machines), the contention-significant performances counters may include those whose values reflect the demands of an executing application for memory resources (e.g., those that collect measurements related to memory access and contention between applications for those resources). In other words, the values of these performance counters have been found to be useful in predicting whether or not the performance of a given pair of applications will be significantly poorer when they are executed together on the same processor socket than it would be if they were executed in parallel on different processor sockets.

Note that on other multi-socket machines, other performance counter values and/or performance metrics based on (or derived from) those values may be well suited for determining which pairs of applications can (or should not) be executed together on the same socket. For example, some processors include a single floating point divide unit that is shared between two or more hardware contexts in each processor core. In such embodiments, a decision may be made to place two applications that both include lots of floating point divide operations (which may be reflected by the value of a performance counter in each of the processor cores) on different sockets so that their performance does not suffer due to competition for the shared floating point divide unit. In another example, some processors include specialized accelerators for encryption or compression that may be shared between processor cores or hardware contexts on the same socket. Note that, in general, the profiling and contention-aware thread scheduling techniques described herein may be applied in any multi-socket system in which performance counters or other mechanisms provide insight into the demands for scarce resources to avoid the need to share those scarce resources between two applications that both have a high demand for those resources. For example, these techniques may be used to pair one application with a relatively high demand for a scarce shared resource together with an application with a much lower demand for that resource on the same socket. Note also that, in some embodiments that do not include performance counters that measure demand for or usage of shared resources directly, a thread scheduler (e.g., a software thread of an application, operating system or runtime system) may be configured to aggregate available performance counter data and/or other information to generate a performance metric that tracks the demand and/or usage of the shared resources. In addition to identifying which hardware performance counters are good predictors of effective program combinations, the profile-driven approach described above may in some embodiments provide a baseline against which adaptive scheduling techniques can be compared.

In various embodiments, the systems described herein may employ one or both of the two contention-aware thread scheduling approaches described below. The first of these approaches uses profile data collected a priori to decide which programs to allocate to which sockets, and the second approach observes the programs at runtime to adaptively allocate programs to sockets. In some embodiments, the profile-driven scheduler may use information about program behavior that was collected a priori to assign programs to particular sockets. With this approach, in order to run a program on the system, it must first be profiled. For example, the application programmer may provide a sample input and the program binary to the system. The program may then be executed exclusively (i.e., in isolation) on a single socket of the machine, and various hardware performance counters (e.g., those that have been determined to be contention-significant for the machine) may be used to measure and/or characterize its behavior. In some embodiments, the values of one or more of these performance counters may be aggregated, transformed (e.g., converted from data that represents counts to data that represents rates that are normalized by the total execution time of the program), combined with other information, or otherwise processed to generate one or more contention-significant performance metrics that are then stored (e.g., in a database table or other data structure) for subsequent use in scheduling decisions.

When, after being so profiled, a program is submitted for execution on the system, the scheduler may examine the performance metrics data that is stored in a database along with the similar data that is stored in the database for every other program that is currently executing in the system. This data may be used to predict the best allocation of programs to sockets, including the more effective pairings for programs to be executed in parallel on the same processor socket. In embodiments in which the system employs this approach, the profile-based scheduling decision may only be made once, e.g., when a program is invoked. In other words, the thread schedule may not be modified during program execution.

Figure 3:
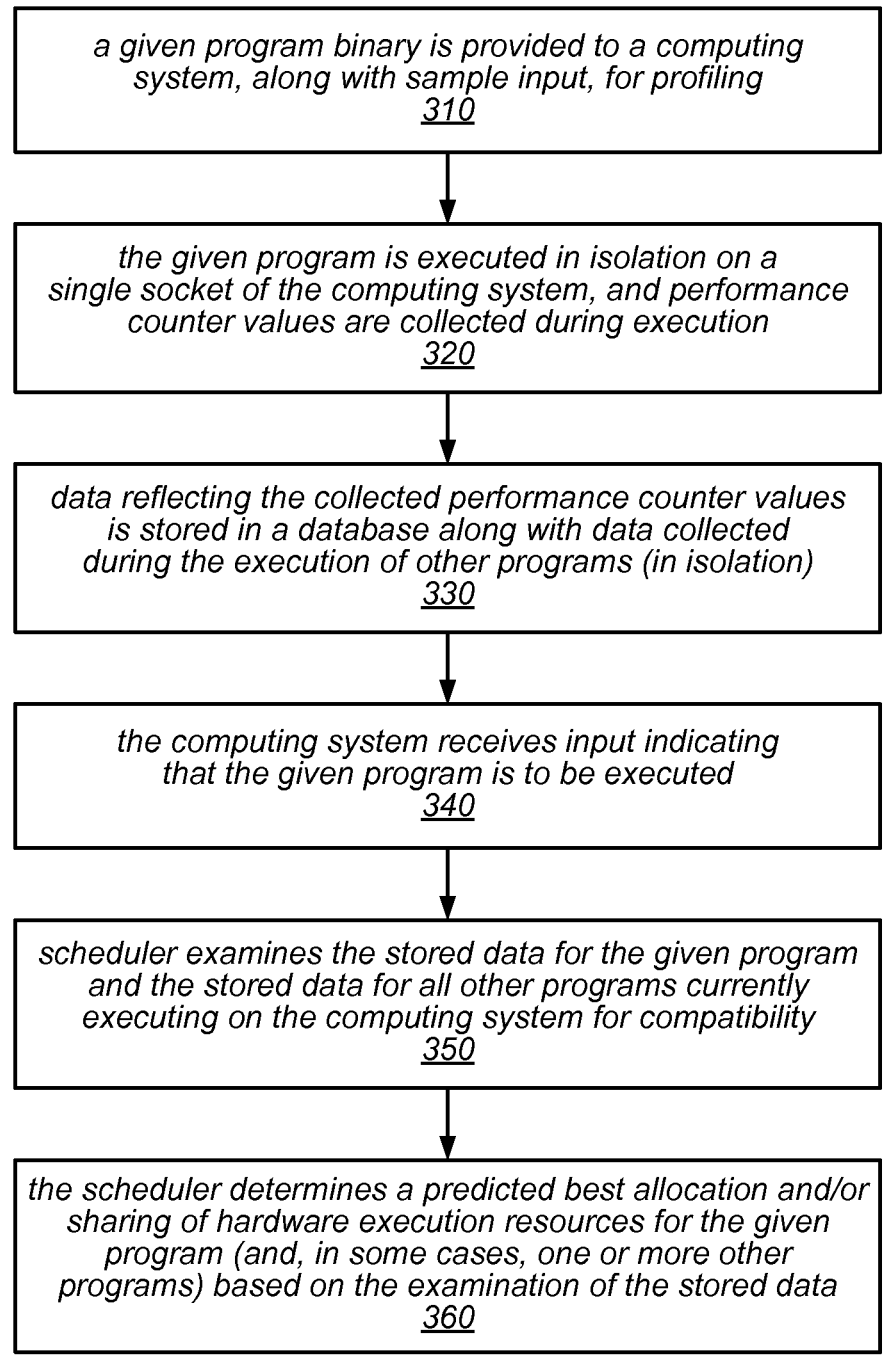
FIG. 3 is a flow diagram illustrating one embodiment of a method for profiling a program with respect to contention-significant performance metrics and using that information in allocating hardware execution resources to software threads.

One embodiment of a method for profiling a program with respect to contention-significant performance metrics and using that information in allocating hardware execution resources to software threads is illustrated by the flow diagram in FIG. 3. As illustrated at 310, in this example, the method may include providing a given program binary (along with sample input) to a computing system for profiling. The method may include executing the given program in isolation on a single socket of the computing system, and collecting performance counter values during execution, as in 320. For example, the values of performance counters within the processor cores of the target multi-socket machine that have been found to be contention-significant may be sampled once or many times during execution, (e.g., periodically). The method may also include storing data reflecting the collected performance counter values (e.g., some or all of the raw collected data or data representing a performance metric created by aggregating the raw collected data, transforming the raw collected data, or combining the raw collected data with other information) in a database along with data collected during the execution (in isolation) of one or more other programs, as in 330.

Subsequently, the method may include the computing system receiving input indicating that the given program is to be executed, as in 340. In response, the method may include a scheduler of the computing system examining the stored data for the given program and the stored data for all other programs that are currently executing on the computing system for compatibility with the given program, as in 350. The method may include the scheduler determining a predicted best allocation and/or sharing of hardware execution resources for the given program (and, in some cases, one or more other programs) based on the examination of the stored data, as in 360. For example, if, based on the stored data, it is determined that the given program has a relatively high demand for certain shared resources, it may be paired for execution with another application with a much lower demand for those shared resources. In some cases in order to implement the determined pairing (or in an attempt to maximize the overall system performance), one or more currently executing programs may be moved to different hardware execution resources (e.g., to different processor sockets or processor cores thereof), after which they will continue their execution on the hardware execution resources to which they have been moved.

Note that, in some embodiments, in order to determine a desired pairing, the system may seek to maximize an objective function that reflects the likely performance of a possible placement. One example objective function is the sum of the absolute differences between the load instruction rates (or other resource demand estimates) for the programs that will potentially be sharing a socket. Another example objective function is the sum of the squares of the differences between the load instruction rates for the programs that will potentially be sharing a socket. Maximizing such objective functions may, in these examples, seek to place programs with high load instruction rates alongside programs with low load instruction rates. Other example objective functions that may be used in determining a desired pairing include hysteresis factors that count against pairings that migrate threads between sockets or that migrate threads that have already migrated recently. Note that, in various embodiments, any of a variety of algorithms may be used to maximize such objective functions, including, but not limited to, an exhaustive search algorithm or an A* ("A star") search.

In some embodiments, an online adaptive scheduler may use the same hardware counters as the profile-drive approach, e.g., the contention-significant performance counters that, for the particular multi-socket machine, have been found to be useful in predicting the best program to socket allocations, but may use them to make thread scheduling decision during program execution. This approach may in some embodiments remove the need for a separate profiling step, may render the approach input agnostic, and may also allow the schedule to adapt to changes in program behavior during program execution. This approach may, however, incur some runtime cost. For example, there may be a direct cost incurred in measuring performance counters dynamically. In addition, there may be indirect costs in that, if the scheduling decision changes, then the caches on the affected processor cores may be perturbed when jobs are moved between processor sockets. In some embodiments, the processor hardware itself may limit the number of hardware events that be measured concurrently. However, in a profiling phase, this constraint does not exist. In some such embodiments, multiple execution runs may be performed, each of which is used to collect different performance counter values.

In embodiments that employ the online adaptive scheduler described herein, when a program starts running, the scheduler may be invoked. Initially, the scheduler may allocate the new program to an arbitrary socket, such that the number of cores allocated to each program is balanced. After a fixed time delay, the scheduler may be invoked again. At this point, the program may have been running long enough to collect data from its hardware performance counters that is sufficient for use in making a more informed decision about the schedule. For example, the schedule may be changed, if necessary to create different pairings of programs that are less likely to suffer performance degradation due to demands on scarce shared resources than the pairings created by the initial placement of the program, after which the software threads of the affected programs may be migrated to different cores as indicated in the modified schedule. In some embodiments that employ this approach, the scheduler may be invoked repeatedly, e.g., with a fixed time period between each invocation. This may ensure that the scheduler runs frequently enough so that it can modify the schedule if a program phase change occurs. In some embodiments, the scheduler may be invoked in response to (or as part of) a context switch in addition to, or instead of, on a periodic basis.

Figure 4:
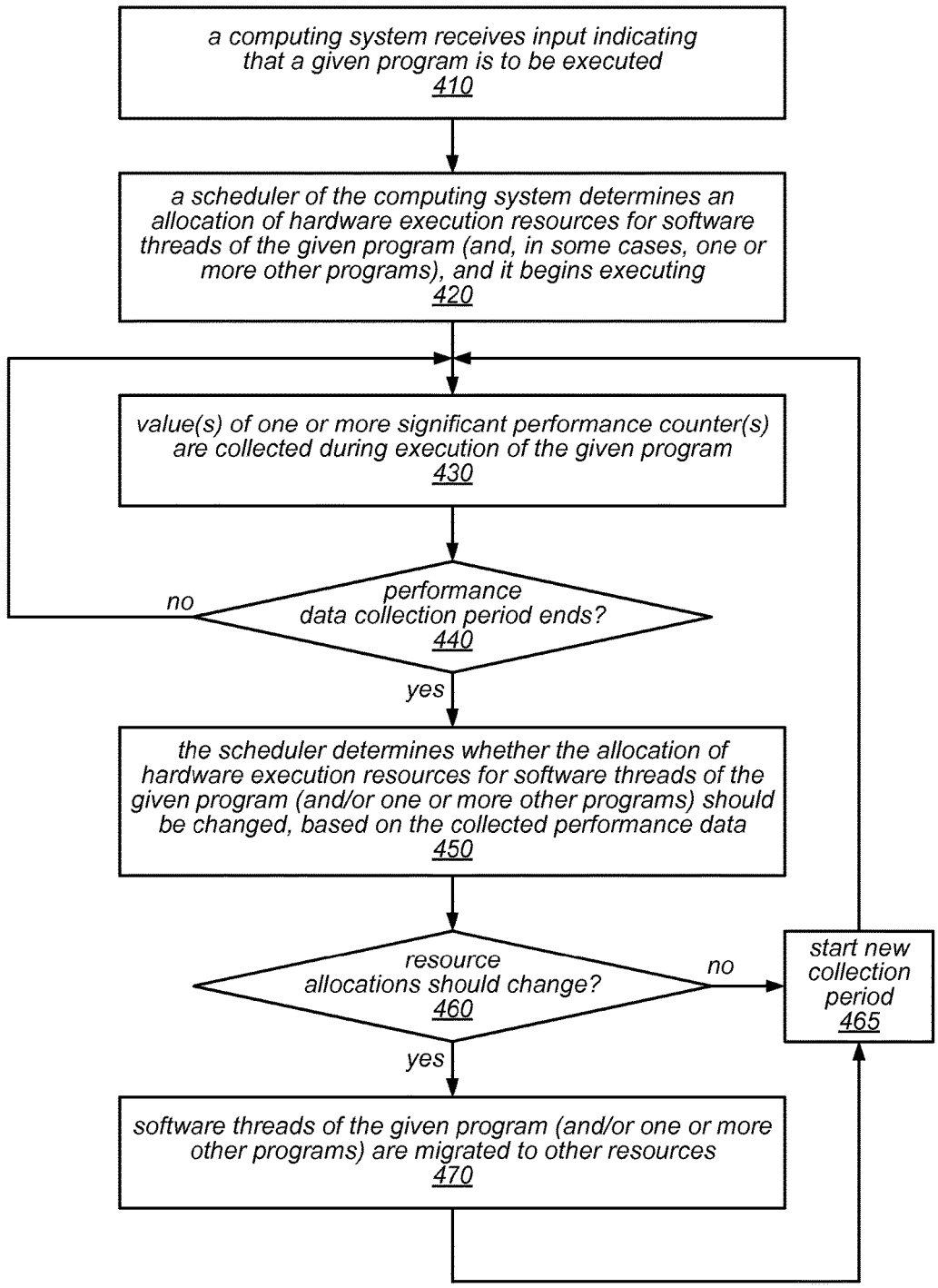
FIG. 4 is a flow diagram illustrating one embodiment of a method for performing adaptive thread scheduling based on runtime collection of contention-significant performance metrics.

One embodiment of a method for performing adaptive thread scheduling based on runtime collection of contention-significant performance metrics is illustrated by the flow diagram in FIG. 4. As illustrated at 410, in this example, the method may include a computing system receiving input indicating that a given program is to be executed. The method may include a scheduler of the computing system determining an allocation of hardware execution resources for software threads of the given program (and, in some cases, one or more other programs), after which the given program begins executing on those resources, as in 420. For example, the determination of which hardware execution resources are allocated to the given program may be done randomly or using a method similar to that illustrated in FIG. 3 (if previously collected profile data exists for the given application), in different embodiments. Note that, if the determination is performed in a manner similar to that illustrated in FIG. 3, the determined program pairings may cause a change in the allocation of hardware resources for another program that is executing in the system. For example, one or more other programs may be assigned by the scheduler to different sockets than the ones on which they were executing prior to the given program being received in order to maximize overall system performance.

As illustrated in this example, the method may include collecting the values of one or more significant performance counters during execution of the given program, as in 430, until the current performance data collection period ends. This is illustrated in FIG. 4 by the feedback from the negative exit of 440 to 430. For example, data may be collected from performance counters whose values have been found to useful in predicting the compatibility of pairs of programs for execution in parallel on the same processor socket. As described herein, in some embodiments, the raw collected data may be stored for subsequent use in scheduling decisions. In other embodiments, the collected performance counter data may be aggregated, transformed, combined with other information, or otherwise processed to generate one or more contention-significant performance metrics that are then stored for subsequent use in scheduling decisions. If (or once) the performance data collection period ends (shown as the positive exit from 440), the method may include the scheduler determining whether the allocation of hardware execution resources for software threads of the given program (and/or one or more other programs) should be changed, based (at least in part) on the collected performance data, as in 450. As noted above, in some embodiments, in order to determine a desired pairing, the system may seek to maximize an objective function that reflects the likely performance of a possible placement. If it is determined that the resource allocations should not be changed at this point, the method may include starting a new collection period and continuing to collect the values of the significant performance counters while execution of the given program continues. This is illustrated by the path from the negative exit of 460 to 465 and from 465 to 430.

As illustrated in this example, if it is determined that at least some of the resource allocations should be changed at this point, the method may include migrating the software threads of the given program (and/or one or more other programs) to other resources, as in 470, and starting a new collection period. This is illustrated in FIG. 4 by the path from 460 to 465 and from 465 to 430. Note that the determination that at least some of the resource allocations should be changed may be the result of the observation of (or a change in) the values of the significant performance counters over the most recent performance data collection period, which may be due (at least in part) to the introduction of another program in the computing system or to completion of the given program or another program.

In various embodiments, the machine profiling, application profiling, and/or contention-aware thread scheduling techniques described herein may be applied in any multi-socket system. For example, in some embodiments, they may be applied in systems that implement dynamic co-scheduling of hardware contexts when executing multiple parallel applications, such as the user-mode execution framework (Callisto) described above. In some such embodiments, a multi-core computer in such a system may implement a resource management layer between the operating system and one or more parallel runtime systems that have been modified to work with components of the resource management layer. The resource management components and resource-management-enabled parallel runtime systems may be configured to work together to use the hardware contexts of the machine efficiently, while reducing load imbalances between multiple parallel applications and avoiding the preempting of threads at inconvenient times.

In some embodiments, runtime systems performing work on behalf of different applications may receive resources on a varying number of hardware contexts as demands of the applications change over time. In some embodiments, the resource management components of the system may co-ordinate to leave exactly one runnable software thread for each hardware context. In some embodiments, the systems described herein may allocate and/or re-allocate hardware threads to various jobs (or worker threads thereof) according to a spatial scheduling policy that grants high priority to one application per hardware context and a temporal scheduling policy that specifies how and when unused hardware contexts should be re-allocated. For example, decisions about whether and/or when to re-allocate hardware contexts may be dependent on whether a job has been granted high priority on a given hardware context or on whether a job that has been granted high priority on a given hardware context has run out of work. In embodiments of the system that implement the machine profiling, application profiling, and/or contention-aware thread scheduling techniques described herein, priority for allocating a given hardware context may be given to an application that has been determined to be compatible with another application that is already executing on the same socket as the given hardware context (e.g., one that does not have the similar demands for scarce shared resources of the socket).

In some embodiments, periodic check-in operations may be performed by the runtime systems (e.g., between tasks or between batches of work items) and may be used to determine (at times convenient to the applications) whether and when various hardware contexts should be re-allocated. The systems described herein may over-subscribe worker threads (e.g., associating a worker thread for each application with each of the hardware contexts in the computer), which, in combination with the dynamic scheduling policies described herein, may reduce load imbalances between the applications. A co-ordination table maintained by the resource management components may store per-hardware-context information about resource demands and allocations. This information may be accessible to the applications and/or the runtime systems, and may be used in determining when and how hardware contexts should be-reallocated.

In some embodiments, applications that are written for and/or compiled over an unmodified parallel runtime system may be run on a resource-management-enabled version of the parallel runtime systems without modification. A common API for synchronization operations that is based on latches and synchronization variables may be used by parallel applications, by resource-management-enabled parallel runtime systems, and by the resource management components, and may provide a single place at which to determining spin/wait decisions for waiting threads and common methods for making those decisions consistently.

Figure 6:
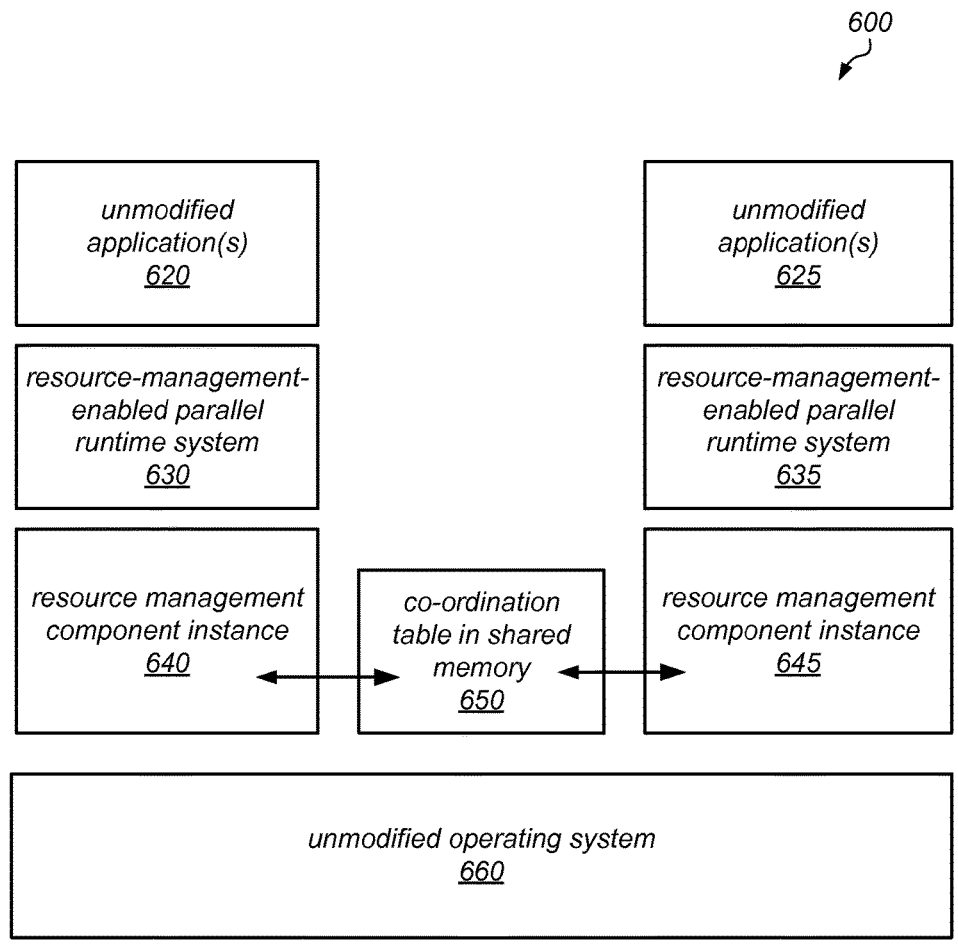
FIG. 6 is a block diagram illustrating one embodiment of a system that implements resource management components and resource-management-enabled parallel runtime systems.

In some embodiments, a resource-management-enabled runtime system that employs the machine profiling, application profiling, and/or contention-aware thread scheduling techniques described herein may use dynamic spatial scheduling to allocate threads to physical cores. An example of the physical structure of one such runtime system is illustrated in FIG. 6 and described below. In some embodiments, every program running on the system spawns and pins a thread to every core. Of the threads pinned to each core, one is designated as the high priority thread, and the remaining threads are designated as low priority threads. The resource management components of the system may ensure that each program has a fair share of high priority threads, and that the main thread for each program is given high priority. This approach may ensure that the main thread can always run, since it often acts as a producer of parallel tasks, and (in such cases) its performance may be critical to the performance of the program as a whole. This approach may also provide a fair distribution of resources across all running programs.

The aim of the user-mode framework (Callisto) described herein may be to allow the high priority threads to run the majority of the time. This may mean that the high priority threads experience minimal interference from other threads running on the system. For example, they may be able to make full use of core-local caches, without the threat of other programs evicting cache lines that would lead to performance degradation. This approach may also reduce the number and frequency of context switches, thus reducing the overhead they incur.

In some embodiments of the user-mode framework (Callisto), in order to maintain good utilization of resources, a low priority thread may be allowed to run when the high priority thread pinned to a particular core is not runnable (e.g., when and if the high priority thread blocks for memory accesses or synchronization). Due to the bursty nature of many parallel workloads (and many of the benchmarks used in the evaluations described herein), this approach may help to make good use of the available hardware resources. In some embodiments, Callisto may limit the frequency with which context switching to low priority threads can occur using a manually specified hysteresis threshold. In some embodiments, if a high priority thread blocks for longer than a fixed number of processor cycles, it may be stopped and a low priority thread may be allowed to run. The high priority thread may only be allowed to run again after it has been runnable for sufficiently many processor cycles (e.g., for at least a pre-determined number of cycles that may be user configurable).

One existing parallel runtime system that may be modified to use the resource management and dynamic scheduling techniques described herein (including adaptive contention-aware thread scheduling) is the OpenMP (Open Multi-Processing) programming model (which encompasses runtime system components and associated programming language abstractions). OpenMP is a conventional runtime system for parallel programming in which the primary way that the program expresses work that can be split over multiple hardware contexts is by using a parallel for loop, and in which batches of these loop iterations can be executed in parallel on the different hardware contexts. For example, if a loop has 1000 iterations and there are 10 hardware contexts, the work may be split evenly across the hardware contexts, and each hardware context may be responsible for performing 100 of the loop iterations.

Traditionally, tuning OpenMP jobs may be assumed to be done by the programmer, and the language specification makes it difficult for a runtime system to adapt the number of threads in use without violating the specification. In existing OpenMP runtime systems, it is generally considered to be a bad thing to over-subscribe the system (i.e., to use more OpenMP threads than there are hardware contexts in the processors). However, in some embodiments of the systems described herein, it has been observed that combining over-subscription with a lightweight cooperative mechanism for switching between threads may avoid the main synchronization costs of oversubscription, while reducing the load imbalances between jobs when running on a dynamically variable number of hardware contexts. In such embodiments, the more OpenMP threads there are, the easier they may be to share evenly between hardware contexts. The results of experiments performed on prototype systems indicate that this approach may reduce the likelihood of interference, reduce the severity of any interference, and/or increase the ability for jobs to benefit from otherwise-idle time in the execution of other jobs.

Figure 5:
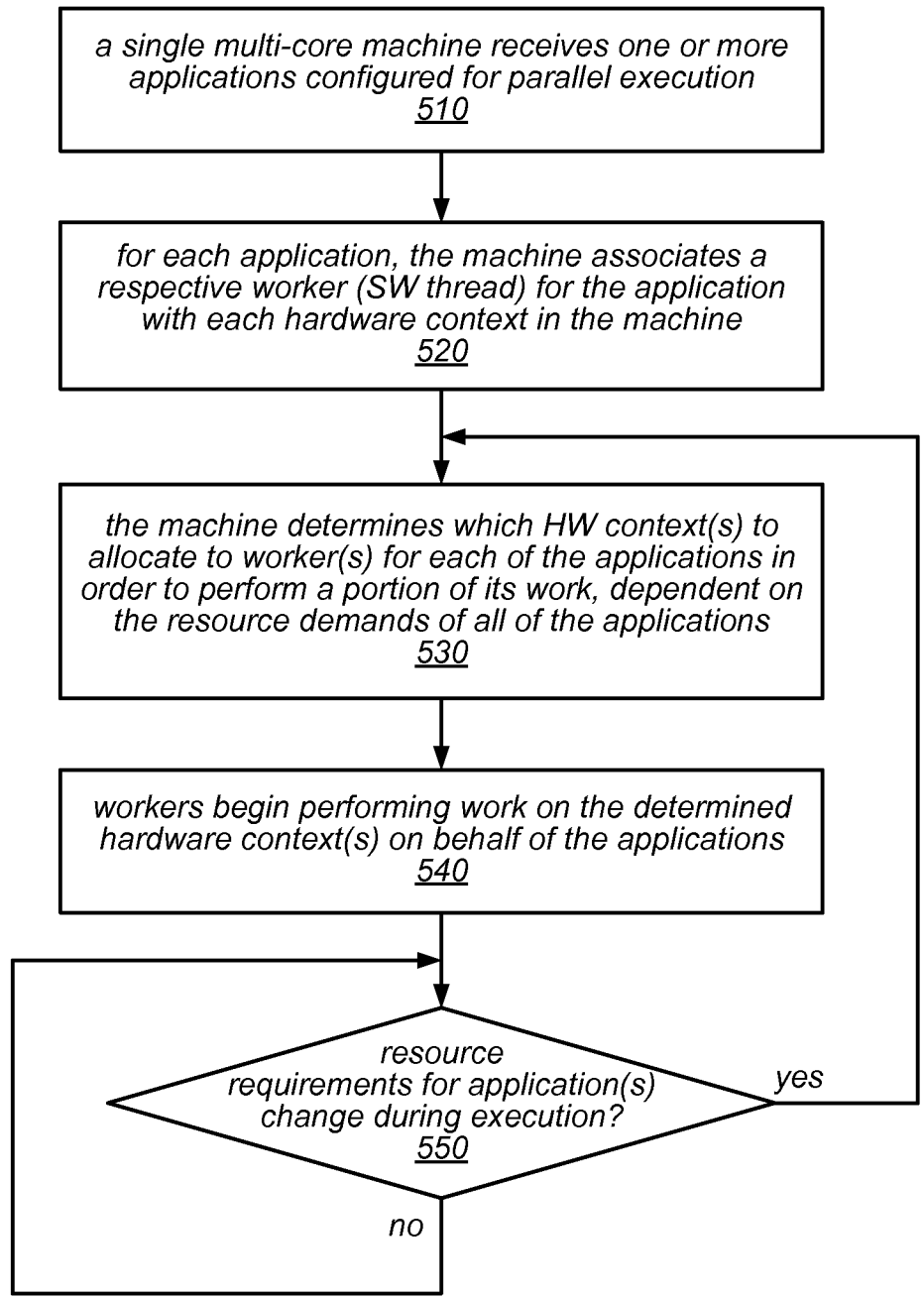
FIG. 5 is a flow diagram illustrating one embodiment of a method for dynamically scheduling parallel applications for execution by parallel runtime systems on a single machine.

One embodiment of a method for dynamically scheduling parallel applications for execution by parallel runtime systems on a single machine is illustrated by the flow diagram in FIG. 5. As illustrated at 510, in this example, the method may include a single multi-core machine receiving one or more applications configured for parallel execution. For example, the runtime system may be a resource-management-enabled parallel runtime system executing over an operating system on a multi-core machine, and it may receive an initial application to be executed or a collection of applications to be executed. The method may include, for each application, the machine (or the runtime system or a resource management component executing thereon) associating a respective worker (e.g., a software thread) for the application with each hardware context in the machine, as in 520.

As illustrated in this example, the method may include the machine (or the runtime system or resource management component executing thereon) determining which hardware context or hardware contexts to allocate to various workers for each of the applications in order to perform a portion of its work, dependent on the resource demands of all of the applications, as in 530. For example, during an initial allocation (when the application or collection of applications is received), the method may include allocating a hardware context to each of two or more workers for each application to perform an initial batch of operations (e.g., some number of loop iterations) for each application. The method may also include the workers beginning to perform work on the determined hardware context(s) on behalf of the applications, as in 540. For example, in some embodiments, each of the workers may make an up-call to an activate function of the resource-management-enabled parallel runtime system in order to claim their respective hardware contexts and being performing work.

If the resource requirements for one or more of the applications change during execution (shown as the positive exit from 550), the method may include repeating at least some of the operations illustrated in FIG. 5 (e.g., beginning at element 530), in order to re-allocate some or all of the hardware contexts as necessary (e.g., according to various applicable policies) and continuing execution of one or more applications. For example, such a re-allocation may be performed in response to the starting and/or completing of various items of work or batches of work items, in response to an executing application (job) reaching completion and/or in response to the submission of an additional application (job). Note that, as described in more detail below, some of the conditions that can trigger such a re-allocation may be detected during execution of a check-in operation. In the example illustrated in FIG. 5, when and if a re-allocation is performed, the machine may allocate one or more of the hardware contexts to perform another batch of work items for the same application on whose behalf the hardware contexts were previously allocated, and/or may allocate one or more of the hardware contexts to different applications than the ones on whose behalf the hardware contexts were previously allocated (assuming they have runnable work). While resource requirements for a set of concurrently executing applications do not change during execution, the method may include the machine continuing to perform work using the current hardware context allocations. This is illustrated in FIG. 5 by the feedback from the negative exit of 550 to its input.

As previously noted, some issues related to scheduling parallel jobs may be exacerbated by the fact that parallel jobs increasingly have burstier CPU demands than traditional workloads. For example, some graph analytics jobs may have CPU demands that vary over 10-100 ms timescales. This variability may provide an impetus to combine jobs, exploiting idle time in one job to make progress in another job.

In various embodiments, the systems described herein may employ any or all of the following techniques to improve performance:

Multiple parallel jobs may co-ordinate their resource demands to leave exactly one runnable software thread for each hardware context. This approach may, in general, avoid the operating system preempting threads transparently.

CPU time may be provided to runtime systems using an up-call mechanism, inspired by scheduler activations. In some embodiments, with this approach, a runtime system may divide its work into small pieces that generally run to completion within each of these up-calls, and that can be multiplexed over however many hardware contexts the runtime system receives.

A single API may be provided for building the synchronization primitives exposed to applications (e.g., locks and barriers), for the synchronization within a runtime system (e.g., managing task pools), and for synchronization within the resource management components themselves. In some embodiments, by combining these three kinds of synchronization, information about which runtime system work is able to execute (e.g., is runnable) may be exposed to the resource management components, and a single point may be provided at which to make spin/block decisions.

One embodiment of a system that implements resource management components and resource-management-enabled parallel runtime systems (and that may be extended to implement adaptive contention-aware thread scheduling), as described herein, is illustrated by the block diagram in FIG. 6. More specifically, FIG. 6 illustrates the overall structure of an example implementation of such a system. In this example, each of the resource management component instances operates as a user-mode shared library that links with resource-management-enabled versions of different parallel runtime systems to implement dynamic co-scheduling of hardware contexts for parallel runtime systems, as described herein. In this example, multiple instances of the library interact through shared memory to cooperatively control the use of the hardware contexts of the machine on which the system is implemented. As previously noted, the runtime systems may be adapted for use with the resource management component instances. However, applications built over these runtime systems (i.e., applications built for executing over the runtime systems prior to their modification for use with the resource management component instances) may operate without modification, and there may be no need to make changes to the underlying operating system in order to support the resource management components and resource-management-enabled parallel runtime systems.

In the example illustrated in FIG. 6, a system 600 includes one or more unmodified applications 620 that are running over resource-management-enabled parallel runtime system 630, and one or more unmodified applications 625 that are running over resource-management-enabled parallel runtime system 635. Note that, in different embodiments, resource-management-enabled parallel runtime systems 630 and 635 may be parallel runtime systems of the same type or different types. For example, in one embodiment, runtime system 630 may be a resource-management-enabled version of an OpenMP runtime system, while runtime system 635 may be a resource-management-enabled version of a task-pool-based runtime system. In other embodiments, both runtime system 630 and runtime system 635 may be resource-management-enabled versions of an OpenMP runtime system, or both runtime system 630 and runtime system 635 may be resource-management-enabled versions of task-pool-based runtime system.

In this example, each resource-management-enabled parallel runtime system links to resource management library functions in a respective resource management component instance. For example, resource-management-enabled parallel runtime system 630 makes calls into resource management component instance 640, and resource-management-enabled parallel runtime system 635 makes calls into resource management component instance 645. Both resource management component instance 640 and resource management component instance 645 operate over an unmodified operating system 660 (which may be one of any of a variety of operating systems). As described in more detail herein, and resource management component instance 640 and resource management component instance 645 coordinate resource allocation (e.g., the allocation of hardware contexts to various jobs and/or work items thereof) through a co-ordination table in shared memory 650.

Typically, with OpenMP (and with other parallel runtime systems that can be modified to use the resource management techniques described herein), applications compiled for the unmodified runtime system may expose a large amount of work that is able to run in parallel. While it may be possible for an application (e.g., an OpenMP application) to request explicit numbers of threads, this usage is not typical. Instead, the number of threads may typically be set by the user when they start the application. In some embodiments, rather than relying on the user to set the number of threads, a resource-management-enabled OpenMP runtime system may use an interface (such as one described in more detail below) to express its own work to one of the resource management components described herein. In some embodiments, the management of the co-ordination table may be entirely the responsibility of these resource management components.

As previously noted, in some embodiments (including in prototypes built to demonstrate the techniques described herein) these resource management components may be implemented as shared libraries running in user mode as part of these applications. However, in other embodiments, they may be implemented as part of the operating system kernel, with the benefit that this approach protects the shared data structure from corruption by the application or by a bug in one of the runtime systems, at a cost of extra transitions between user mode and kernel mode and extra engineering effort to build them in the kernel.

Figure 7A:
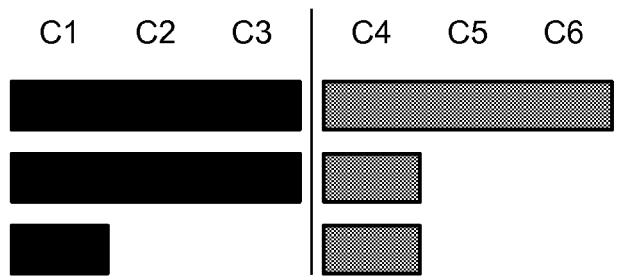
FIGS. 7A-7C illustrate the effects of different policies on the allocation of six processor cores (or hardware contexts thereof) to two jobs, according to at least some embodiments.
Figure 7B:
Figure 7C:
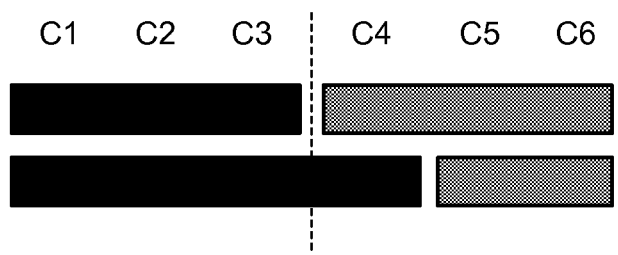

FIGS. 7A-7C illustrate the effects of different policies on the allocation of six processor cores (or hardware contexts thereof) to two jobs, according to at least some embodiments. In these figures, the first one of the jobs is represented by the solid bars in the figures, while the second job is represented by the stippled bars. Note that in these figures, time quanta run from top to bottom. FIG. 7A illustrates the application of a static spatial allocation policy in which the processor cores are statically partitioned between the two jobs for the duration of their executions. In this example, cores C1, C2, and C3 are allocated to the first job, and cores C4, C5, and C6 are allocated to the second job. During a first time period, the first job executes on all three of its allocated cores (C1, C2, and C3) and the second job executes on all three of its allocated cores (C4, C5, and C6). During a second time period, the second job executes on only one of its allocated cores (C4), and the first job again executes on all three of its allocated cores (C1, C2, and C3). In this example, the first job still has more work to do. However, the static partitioning approach prevents the first job from using either of the idle cores (C5 and C6) during the second time period. In this example, during a third time period, the first job executes on only one of its allocated cores (C1), and the second job executes on only one of its allocated cores (C4).

FIG. 7B illustrates the application of a gang-scheduled allocation policy in which the two jobs take turns using as many cores as they can (based on the availability of runnable threads) during alternate time slices. In this example, in a first time period, all of the cores are allocated to the first job, which executes on five of them (C1, C2, C3, C4, and C5). In a second time period, all of the cores are allocated to the second job, which executes on four of them (C1, C2, C3, and C4). In a third time period, all of the cores may again be allocated to the first job, which executes on only two of them (C1 and C2), and in a fourth time period, all of the cores may again be allocated to the second job, which executes on only one of them (C1). As illustrated in FIG. 7A and FIG. 7B, neither of these approaches is able to take advantage of peaks and troughs in the resource demands of the two jobs.

FIG. 7C illustrates the application of a dynamic spatial allocation policy in which processor cores (or hardware contexts thereof) may be dynamically re-allocated in response to peaks and troughs in the resource demands of multiple concurrent jobs. In this example, during the first time period, cores C1, C2, and C3 are allocated to the first job (which executes on all three of them), and cores C4, C5, and C6 are allocated to the second job (which executes on all three of them). However, for the second time period, one of the cores that was originally allocated to the second job (C4) has been re-allocated to the first job. Therefore, the first job is able to execute on four cores (C1, C2, C3, and C4), while the second job executes only on two of the cores that were originally allocated to it (C5 and C6). Note that with this approach, both of the jobs are able to complete their executions within two time slices, rather than in three or four time slices, as with the approaches illustrated in FIGS. 7A and 7B, respectively.

In some embodiments, the thread scheduler of the user-mode runtime system (Callisto) described herein may treat the system as a homogeneous array of cores. For example, it may arbitrarily assign programs to cores, and may allow a program to have threads running on different sockets. This means it does not necessarily allocate programs to sockets in a manner that reduces interference. In addition, this approach can lead to a situation in which a low priority thread is run on a different socket than the high priority threads of the same program. This is likely to incur additional intra-socket communication as data is copied to the caches on the other socket. Synchronization may also have to be performed across the socket boundary in this case, which may cause the high priority threads to block whilst waiting for the low priority thread to complete.

The scheduling approaches described herein (e.g., profile-based and adaptive contention-aware techniques for thread scheduling) may extend Callisto by considering the fact that the processor cores exist in separate processor sockets. With these approaches, the system may attempt to automatically allocate programs to sockets such that interference and contention for resources is minimized. In some embodiments that implement the profile-based and adaptive contention-aware techniques for thread scheduling described herein, all of the threads for each program may be kept on the same socket (e.g., to avoid a situation in which a low priority thread of the program is run on a different socket). However, in some embodiments, within each socket, the techniques implemented by Callisto may be used to schedule the threads. This approach may improve resource utilization within each socket by allowing low priority threads to run if the high priority threads block.

In some embodiments, an online adaptive scheduler that is implemented in the user-mode framework (Callisto) described herein may include several threads. For example, each application may be split into a main thread and a set of worker threads. The worker threads may be configured to record the values of various performance counters within the cores on which they run (e.g., in between the time periods in which they perform pieces of work on behalf of the application). In some embodiments, the worker threads may collect and record the performance counter values by calling a performance monitor API (e.g., periodically or in response to certain trigger events). The scheduler thread may be configured to run periodically (e.g., once every second) and may share the same processor core as the application's main thread. Note, however, that since the scheduler thread runs only once every second, in this example, interference from the scheduler thread may be extremely low. In some embodiments, the scheduler thread, when it runs, may be configured to examine the performance counter values that were recorded by the worker threads, to produces an aggregate value for that application, and to write the aggregate value (and/or any other contention-significant performance metrics that are based on or derived from the performance counter values or the aggregate value) to a table in shared memory. The behavior of these threads is illustrated in FIG. 8 and described in more detail below.

In some embodiments, in the approach to thread scheduling that is implemented in the Callisto system, that there may be cooperation between all of the applications that are executing on the multi-socket machine to ensure that only software threads of one application are running on each of the cores within the machine. In such embodiments, when an application decides, based on its own performance counter/metrics information and on performance counter/metrics information from all of the other applications that are running on the multi-socket machine, that a different mapping of applications onto processor sockets (or processor cores thereof) would lead to a performance improvement, it may be up to the affected applications to move themselves to different the other processor sockets (or cores). In some embodiments, the scheduling approach implemented in the Callisto system may be extended such that the scheduling information that is shared across all of the processors is updated to indicate which applications (and software threads thereof) should be placed on particular ones of the sockets. Note that the Callisto system already included a table in shared memory that was shared across the entire multi-socket machine that indicated, for each of the hardware contexts, which of the applications should be running on the hardware context (e.g., or at least identified the highest priority software thread on each core).

In one example, if processes A, B, C, D were presented to the Callisto system for execution, the system may initialize the process to core mappings such that process A executes on the first portion of the hardware contexts, process B executes on the next one, and so on, and this mapping would be visible in the shared table (which resides in shared memory) by all four processes. In some embodiments, the table may be protected by a lock such that only one of the processes can update it at a time. In some embodiments, this approach may be extended by modifying that table to reflect changes in the placement of the applications on the cores. In some such embodiments, each of the processes may be able to see the performance counter information from each of the other processes. Therefore, they may all arrive at the same determination about which pairs (or other collections) of applications should be executed together on the same socket (e.g., by using the performance counter information to predict which pairs or other collections of applications will work well together). Any threads that are affected by the thread scheduling decision may observe this information in the shared table and may move themselves to the cores to which they are newly assigned (assuming they are not already running on those cores).

Figure 8:
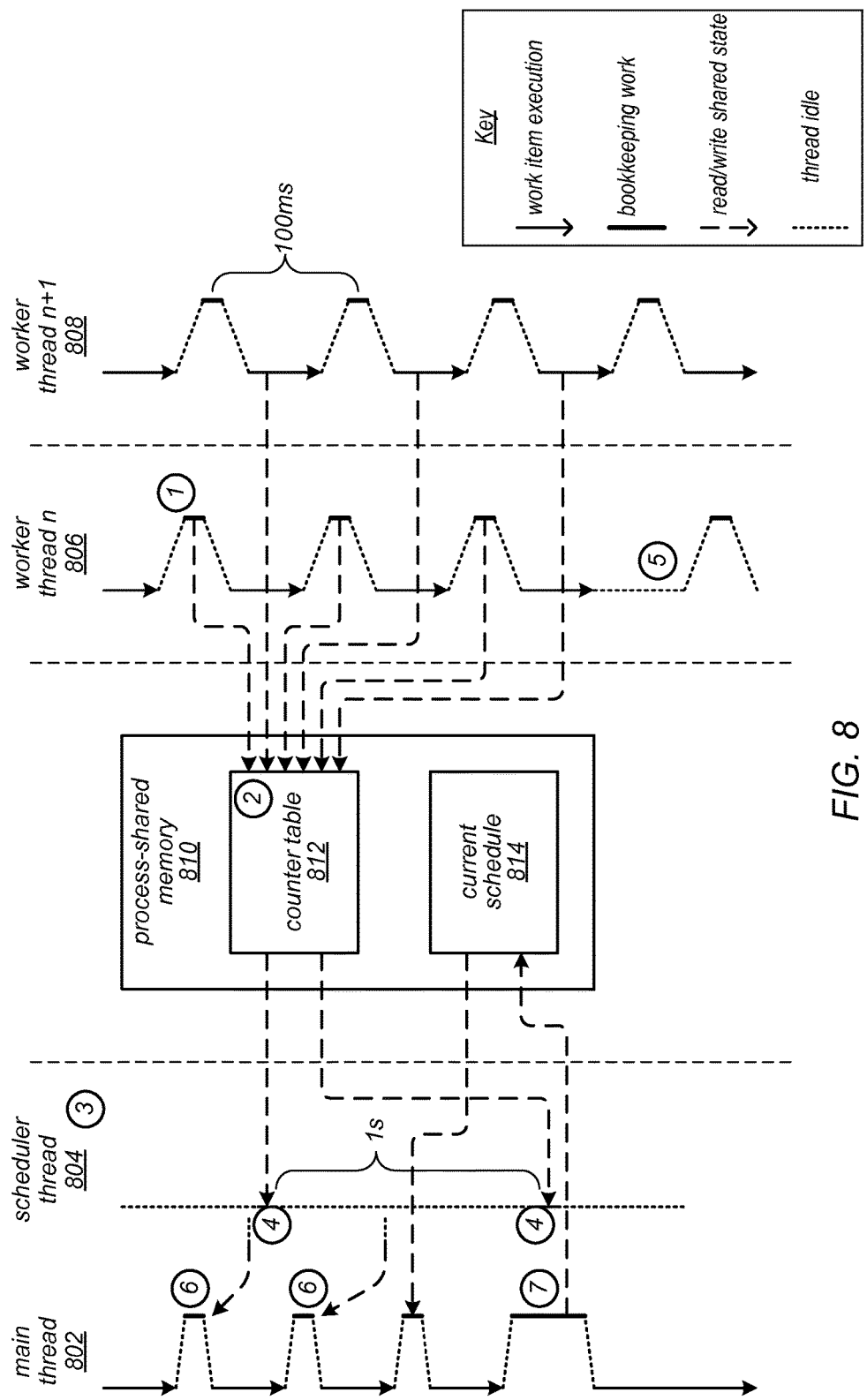
FIG. 8 illustrates the operation of a system that implements adaptive contention-aware thread placement, according to at least some embodiments.

FIG. 8 illustrates the operation of a system that implements adaptive contention-aware thread placement, according to at least some embodiments. In this example, adaptive contention-aware thread placement is implemented over a user mode execution framework such as Callisto. However, similar operations may take place in other multi-socket systems on which these techniques are implemented, in different embodiments. As described above, each worker thread (e.g., worker threads 806 and 808) may periodically collect the values of a set of hardware performance counters by calling an API of a performance-focused library (as shown at circle 1 in FIG. 8). In the example illustrated in FIG. 8, the performance monitor is configured to update the counters once every 100 ms, however this may be configurable. As illustrated in FIG. 8, a process-shared memory 810 maintains a data structure (counter table 812) that stores these measurements for each thread in each process running on the system (as shown at circle 2 in FIG. 8). In some embodiments, the values stored in this table may represent an exponential moving average of all counter values measured during program execution, and this moving average may be used to smooth the counter values, e.g., to avoid allowing short phase changes in program execution to affect the scheduling decision.

As noted above, each program may spawn (as shown at circle 3) an additional thread (e.g., scheduler thread 804) that is configured to perform regular updates to the scheduling decision. This thread may be pinned to the same core as the main thread for the program (e.g., main thread 802). As illustrated in this example, the scheduler thread 804 may periodically check the information collected by the performance monitor to determine whether the thread schedule should change (as shown by the two circles labeled as circle 4). In this example, the scheduler is configured to check the schedule once every second, however this is configurable. In some embodiments, the scheduler may compute the arithmetic mean of the counter values for each thread in each program, and may then compute a value indicating the system performance using a contention-significant heuristic such as the one described above (a heuristic based on the absolute differences between the rates at which load instructions are attempted by various application pairs) for every possible schedule. The schedule with the best heuristic performance value may then be chosen as the new schedule.

As previously noted, in some embodiments, the system may spawn one worker thread for each core on the system, and may pin each thread to a core. Work may then be allocated to those worker threads (e.g., worker threads 806 and 808) based on the schedule, and any threads that are not allocated work, or that run out of work to do, may simply remain idle (as shown at circle 5). Using this approach, changes to the schedule may be realized as soon as a new work item is allocated to a thread. Note that, in some embodiment, if a thread is currently executing a work item, but the schedule changes, the thread may continue to perform the work item until its completion. In some embodiments, in order to make use of the temporal scheduling techniques implemented in Callisto, the scheduler may also allocate low priority threads to cores. In some embodiments, these may be set to the threads from the other application that is sharing the same socket.

In some embodiments, the system may handle the main thread of a program (such as main thread 802 in FIG. 8) differently than the other threads. For example, in some embodiments, each program's main thread may be pinned to a separate core. When the schedule changes, the main thread must be migrated to a new core. Therefore, the main thread 802 may be configured to periodically check the current schedule (as stored in current schedule 814 in process-shared memory 810) to see whether it has been modified (as shown at circle 7). In some embodiments, such a check may be performed whenever a new work item is spawned. In some embodiments, if the schedule changes, the main thread may use a process-shared data structure to update its own affinity mask, and the affinity mask of every other main thread running on the system, in order to initiate the implementation of the schedule change (shown in FIG. 8 by the two circles labeled as circle 6).

Figure 9:
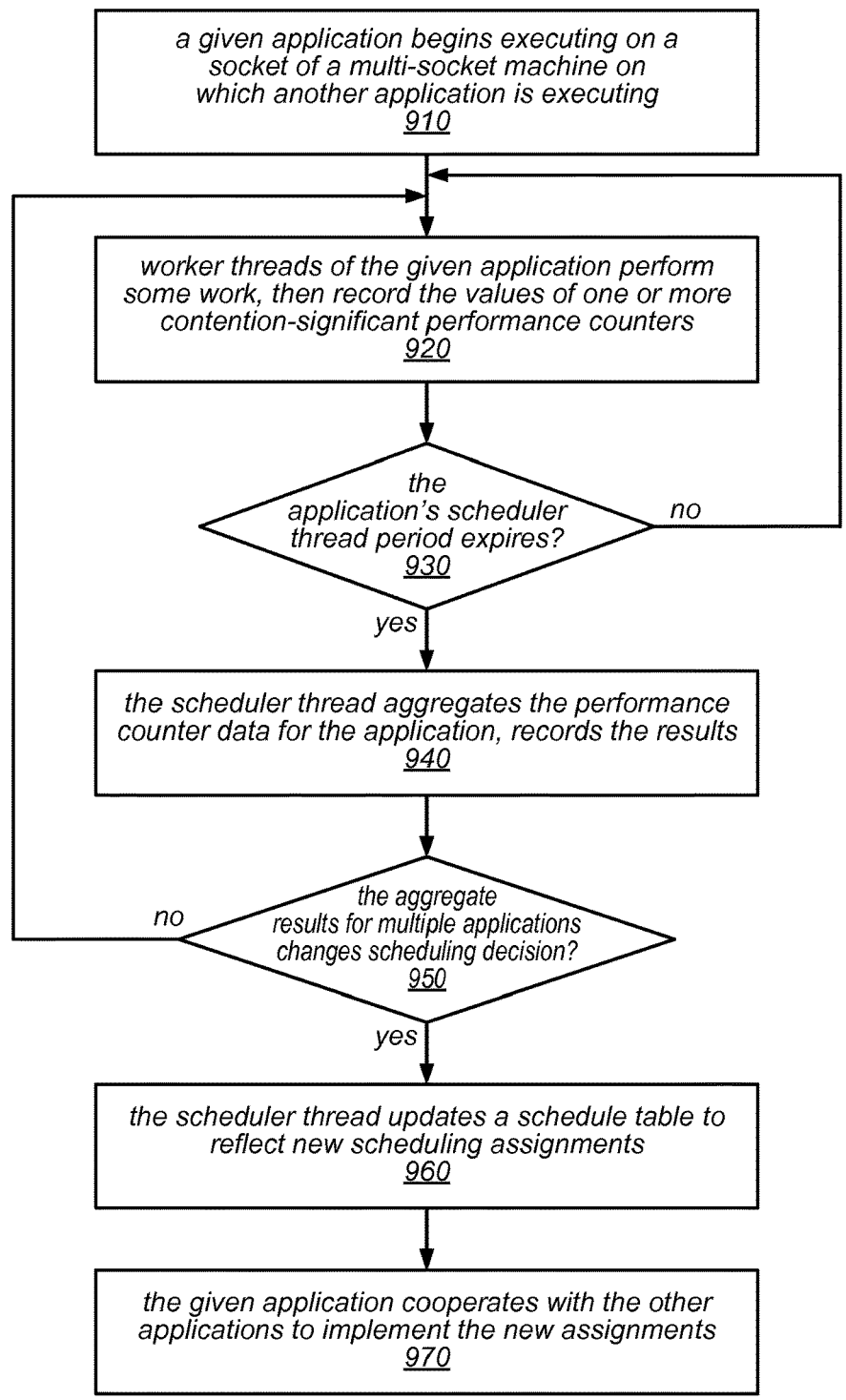
FIG. 9 is a flow diagram illustrating one embodiment of a method for making dynamic resource scheduling decisions for an application executing on a multi-socket machine by applications operating in a user mode.

One embodiment of a method for making dynamic resource scheduling decisions for an application executing on a multi-socket machine by applications operating in a user mode is illustrated by the flow diagram in FIG. 9. As illustrated at 910, in this example, the method may include a given application beginning execution on a particular socket of a multi-socket machine (e.g., a socket on which another application is currently executing). Note that the given application may be executing on the particular socket as a result of an initial scheduling decision, such as one based on profiling data for the two applications (e.g., profiling data based on one or more contention-significant performance metrics). The method may include one or more worker threads of the given application performing some work, after which they record the values of one or more contention-significant performance counters of the cores on which they run, as in 920.

As illustrated in FIG. 9, until a pre-determined scheduling period for the scheduler thread of the given application expires, the method may include the worker threads of the given application continuing to perform work and record the values of one or more contention-significant performance counters. This is illustrated in FIG. 9 by the feedback from the negative exit of 930 to 920. Once the given application's scheduler thread period expires, shown as the positive exit from 930, the method may include the scheduler thread aggregating the performance counter data for the application, and recording the results, as in 940.

As illustrated in this example, if the aggregated performance counter data for the given application and one or more other applications currently executing on the multi-socket machine indicates that a different thread scheduling decision should be made, shown as the positive exit from 950, the method may include the scheduler thread updating a schedule table to reflect new scheduling assignments, as in 960, after which the method may include the given application cooperating with the other applications executing on the multi-socket machine to implement the new assignments, as in 970. However, if the aggregated performance counter data for the given application and the other applications does not indicate that the thread scheduling should change, shown as the negative exit from 950, the method may include repeating the operations illustrated at 920-950 until or unless aggregated performance metrics for multiple applications executing on the multi-socket machine indicate that a different scheduling decision should be made.

Note that while the examples illustrated in FIG. 8 and in FIG. 9 describe embodiments in which the machine profiling, application profiling, and/or contention-aware thread scheduling techniques described herein are applied in a system that implements the user-mode execution framework (Callisto) described herein, in other embodiments of a multi-socket system that do not include the resource-management-enabled parallel runtime systems of Callisto, a component, thread, or process of the operating system may be configured to perform many of the operations described herein as being performed by an adaptive contention-aware thread scheduler. For example, the operating system may be configured to collect performance counter data, to aggregate it, transform it, combine it with other information, or otherwise process it to generate one or more contention-significant performance metrics that are then stored for subsequent use in thread scheduling decisions. In some embodiments, when context switching, the operating system may be configured to record information about the resource demands and/or resource usage for a thread that it is switching away from, and may be responsible for aggregating that within the process and/or for making decisions about which processes should be placed on which sockets based, at least in part, on that information.

Figure 10:
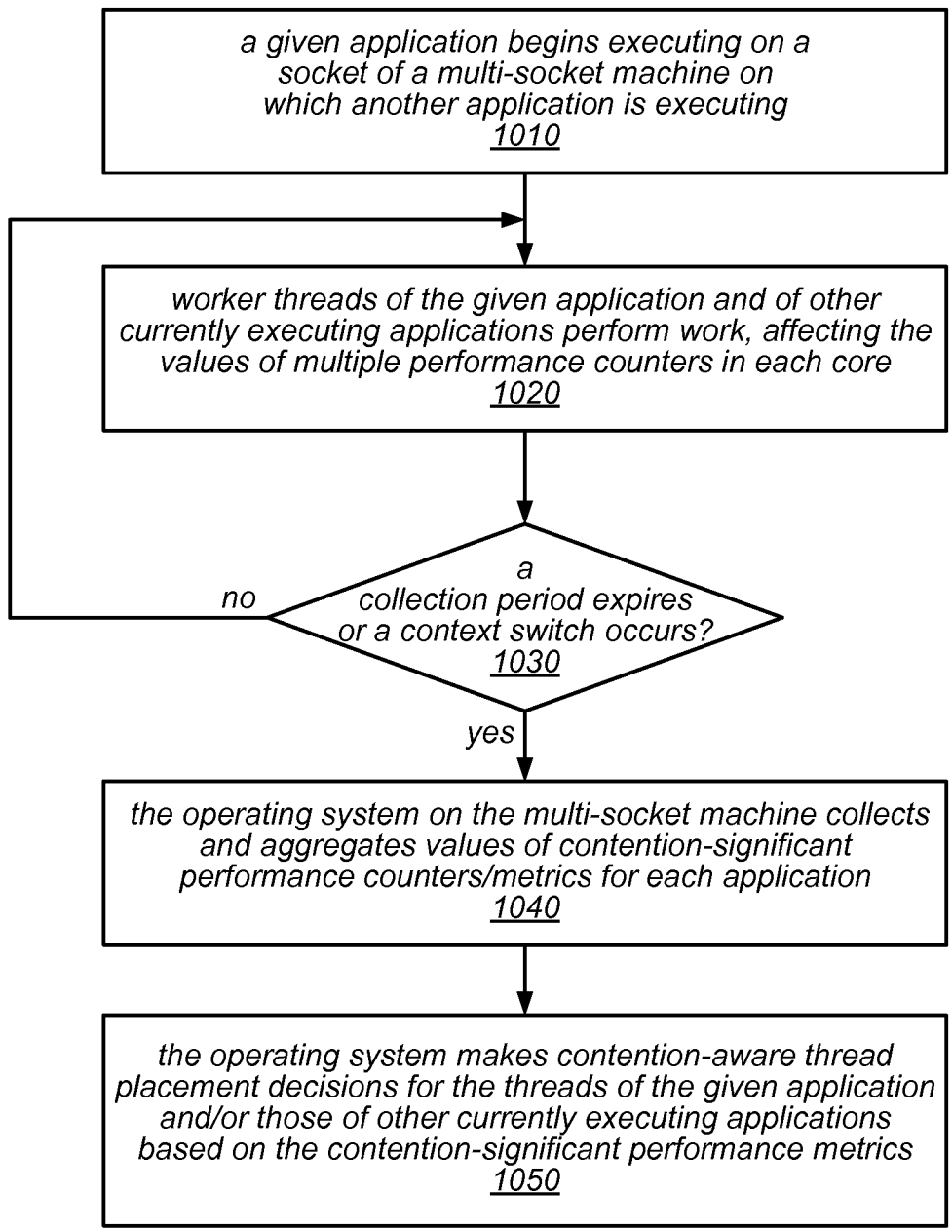
FIG. 10 is a flow diagram illustrating one embodiment of a method for making thread placement decisions for applications executing on a multi-socket machine by an operating system (e.g., in kernel mode).

One embodiment of a method for making thread placement decisions for applications executing on a multi-socket machine by an operating system (e.g., in kernel mode) is illustrated by the flow diagram in FIG. 10. As illustrated at 1010, in this example, the method may include a given application beginning execution on a particular socket of a multi-socket machine on which another application is executing (e.g., as determined by an initial thread placement decision). The method may include one or more worker threads of the given application and of other currently executing applications performing work, which may affect the values of multiple performance counters in each core, as in 1020.

As illustrated in this example, until a pre-determined collection period expires or a context switch occurs, the method may include the worker threads of the given application and of other currently executing applications continuing to perform work, affecting the values of multiple performance counters in each core. This is illustrated in FIG. 10 by the feedback from the negative exit of 1030 to 1020. If and when the collection period expires or a context switch occurs, shown as the positive exit from 1030, the method may include the operating system on the multi-socket machine collecting and aggregating values of one or more contention-significant performance counters/metrics for each application, as in 1040. The method may also include the operating system making contention-aware thread placement decisions for the threads of the given application and/or those of other currently executing applications based on the contention-significant performance metrics, as in 1050. Note that at least some of the thread placement decisions may involve moving applications (or threads thereof) to different hardware execution resources (e.g. different cores or sockets).

In various embodiments, the techniques described herein for performing machine profiling, application profiling, and/or adaptive contention-aware thread scheduling may reduce interference and resource contention between applications in pairs of applications that are executing in parallel on the same socket. As noted above, evaluations that compared the adaptive contention-aware thread scheduling techniques described herein and existing thread scheduling techniques have shown that these new techniques may, in some cases, result in a 20% improvement in ANTT and a 37% improvement in STP on average, compared to the thread scheduling techniques in the existing systems.

As previously noted, there appears to be an increasing impetus for making good utilization of hardware in order to save energy (e.g., by avoiding leaving resources idle), to improve performance (e.g., by allowing jobs to use resources that would otherwise sit idle), or to reduce costs (e.g., by allowing more jobs to be packed onto a smaller set of multi-core machines). In various embodiments, the techniques described herein for implementing dynamic co-scheduling of hardware contexts and/or adaptive contention-aware thread placement for parallel runtime systems may significantly improve the performance of sets of jobs running together on a shared machine at high utilization.

While described in terms of particular operating systems and runtime systems, these techniques may be more generally applicable to any systems that are responsible for sharing resources between multiple competing parallel workloads, in different embodiments. For example, they have be applicable to both operating systems and virtual machine monitors. Note also that, while the examples included herein described embodiments in which these thread scheduling techniques were applied to determine pairs of applications that are suitable for execution in parallel on the same socket, in other embodiments, they may be extended to apply to a wider range of workloads, to larger numbers of concurrently running programs, to finer grained scheduling (e.g., to co-scheduling of individual threads, rather than entire programs of threads) and/or to a wider variety of hardware platforms (including, e.g., those that implement hyper-threading).

While the thread scheduling techniques described herein are presented using several examples in which applications (or software threads thereof) are co-scheduled for execution on multiple cores within a single processor socket, these techniques may be applied in systems and machines having different processor core (and/or hardware execution context) configurations, in other embodiments. In some embodiments, they may be applied in machines having a single processor socket that includes multiple collections of processor cores, or to settings within a single socket in a multi-socket machine. For example, in one processor architecture that includes multiple collections of cores that are organized as "core clusters" within a single socket, each of the individual core clusters may exhibit many of the performance characteristics of separate processor sockets (e.g., those due to the sharing of one or more hardware resources between the processor cores in each of the collections of processor cores). In this example, the thread scheduling techniques described herein may, in some embodiments, be used to co-schedule compatible applications on various ones of the core clusters.

Example System

Figure 11:
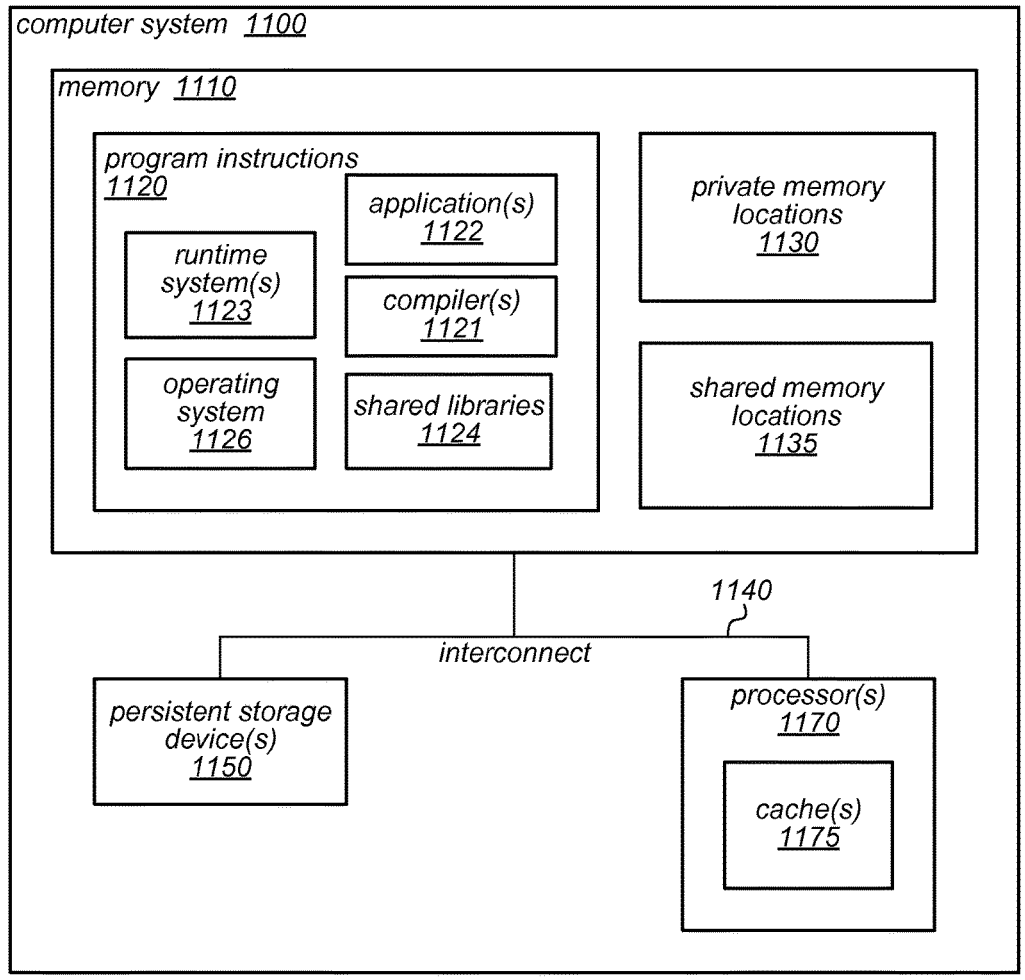
FIG. 11 illustrates a computing system that is configured to implement adaptive contention-aware thread placement, according to at least some embodiments.

FIG. 11 illustrates a computing system configured to implement some or all of the methods described herein, according to at least some embodiments. The computer system 1100 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing the techniques described herein (including dynamic co-scheduling of hardware contexts for parallel runtime systems and/or adaptive contention-aware thread placement) may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1100 may include one or more processors 1170; each may include multiple cores, any of which may be single or multi-threaded. For example, multiple processor cores may be included in a single processor chip (e.g., a single processor 1170), and multiple processor chips may be included on a CPU board, two or more of which may be included in computer system 1100. In addition, each processor 1170 (or core thereof) may include one or more performance counters, such as those described above. Each of the processors 1170 may include a hierarchy of caches, in various embodiments. For example, each processor chip may include multiple L1 caches (e.g., one per processor core) and one or more other caches (which may be shared by the processor cores on the processor chip). Each processor 1170 may also include one or more other resources that are shared between two or more cores (e.g., a floating point divide unit or a specialized accelerator for encryption or compression), in some embodiments. The computer system 1100 may also include one or more persistent storage devices 1150 (e.g. optical storage, magnetic storage, hard drive, tape drive, solid state memory, etc) and one or more system memories 1110 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 11 (e.g., video cards, audio cards, additional network interfaces, peripheral devices, a network interface such as an ATM interface, an Ethernet interface, a Frame Relay interface, etc.)

The one or more processors 1170, the storage device(s) 1150, and the system memory 1110 may be coupled to the system interconnect 1140. One or more of the system memories 1110 may contain program instructions 1120. Program instructions 1120 may be executable to implement one or more compilers 1121, one or more applications 1122 (which may include parallel computations suitable for execution on multiple hardware contexts, as described herein), one or more runtime systems 1123 (which may include resource-management-enabled runtime systems), shared libraries 1124, and/or operating systems 1126. In some embodiment, program instructions 1120 may be executable to implement a contention manager (not shown). Program instructions 1120 may be encoded in platform native binary, any interpreted language such as Java™ byte-code, or in any other language such as C/C++, Java™, etc or in any combination thereof. The program instructions 1120 may include functions, operations and/or other processes for implementing dynamic co-scheduling of hardware contexts for parallel runtime systems and/or adaptive contention-aware thread placement, as described herein. Such support and functions may exist in one or more of the shared libraries 1124, operating systems 1126, or applications 1122, in various embodiments. For example, in some embodiments, the resource management components described herein may be implemented as user-mode shared libraries that link with resource-management-enabled versions of different parallel runtime systems to perform dynamic co-scheduling of hardware contexts and/or adaptive contention-aware thread placement for those parallel runtime systems.

The system memory 1110 may further comprise private memory locations 1130 and/or shared memory locations 1135 where data may be stored. For example, shared memory locations 1135 may store various tables in which local or aggregated performance counter data or performance metrics, resource demands, and/or resource allocations are recorded on a per-application or per-hardware-context basis (such as counter table 812 and/or current schedule 814 in process-shared memory 810) and/or other data accessible to concurrently executing threads, processes, or transactions, in various embodiments. In addition, the system memory 1110 and/or any of the caches of processor(s) 1170 may, at various times, store delay parameter values, hysteresis parameter values, periodic check-in parameter values, spinning limit values, lists or queues of work items or work tickets, values of condition variables or synchronization variables, lists or queues of predicates, latch structures, state information for latches, state information for jobs, work items or work tickets, priority information for jobs and/or hardware contexts, identifiers of jobs, software threads and/or hardware contexts, various counters or flags, threshold values, policy parameter values, maximum count values, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of runtime systems, resource management components, structures, and scheduling policies, it should be noted that the techniques and mechanisms disclosed herein for implementing dynamic co-scheduling of hardware contexts for parallel runtime systems and/or adaptive contention-aware thread placement may be applicable in other contexts in which the types of runtime systems, resource management components, structures, and scheduling policies are different than those described in the examples herein. It is intended that the following claims be interpreted to embrace all such variations and modifications.

What is claimed:

1. A method, comprising:
performing, by a computer that includes multiple processor sockets, each of which includes one or more processor cores, and one or more hardware performance counters in the one or more processor cores:
receiving an application that is configured for parallel execution on the computer;
determining, dependent on profile data that characterizes behavior of the computer when multiple applications are executed in parallel on a single one of the processor sockets, that the application is to be executed on a given one of the multiple processor sockets while a particular other application is also executing on the given one of the multiple processor sockets, wherein the profile data indicates that values of the one or more performance counters predict whether or not performance of a pair of applications executed in parallel on one of the multiple sockets will be lower than performance of the pair of applications when executed in parallel on respective different ones of the multiple sockets;
beginning execution of the given application, wherein execution of the given application comprises executing program instructions that perform work on behalf of the given application and that cause a respective value of each of the one or more hardware performance counters in the one or more processor cores of the given one of the multiple processor sockets on which respective software threads of the given application are executing to be updated; and determining, prior to completing execution of the given application or the particular other application, and dependent on the updated values of the one or more performance counters, that execution of the given application or execution of the particular other application is to be migrated to a different one of the multiple processor sockets.

2. The method of claim 1, wherein the updated values of the performance counters are indicative of an extent to which the given application and the particular other application compete for a resource of a given type on the given processor socket that is shared by the given application and the particular other application.

3. The method of claim 2, wherein said determining that execution of the given application or execution of the particular other application is to be migrated to the different one of the multiple processor sockets comprises determining that demand for the shared resource by both the given application and the particular other application is higher than demand for shared resources of the given type by a different application executing on a different processor socket.

4. The method of claim 3, further comprising: selecting the different one of the multiple processor sockets, wherein selecting the different one of the multiple processor sockets comprises identifying the different processor socket on which executing the different application for which demand for shared resources of the given type is lower than the demand for the shared resource by the given application.

5. The method of claim 2, wherein the updated values of the performance counters are indicative of a demand by the given application for shared memory resources.

6. The method claim 2, wherein the updated values of the performance counters are indicative of a cache miss rate for the given application or a rate at which load instructions are attempted by the given application.

7. The method of claim 1, wherein the profile data that characterizes behavior of the computer when multiple applications are executed in parallel on a single one of the multiple processor sockets of the computer indicates that contention for a shared resource of a given type by multiple applications executing in parallel on a single one of the multiple processor sockets negatively impacts the performance of the multiple applications.

8. The method of claim 1, wherein the method further comprises, prior to said receiving, performing an operation to characterize behavior of the computer when multiple applications are executed in parallel on a single one of the multiple processor sockets of the computer;
wherein characterizing behavior of the computer comprises one or more of:
identifying the one or more performance counters whose values predict whether or not the performance of a pair of applications executed in parallel on the same one of the multiple sockets will be lower than the performance of the pair of applications when executed in parallel on respective different ones of the multiple socket; or
identifying the given type of the shared resources for which contention by multiple applications executing in parallel on a single one of the multiple processor sockets negatively impacts the performance of the multiple applications.

9. The method of claim 1, further comprising:
performing, periodically, at pre-determined time intervals, an operation to determine whether or not execution of the given application or execution of the particular other application should be migrated to a different one of the multiple processor sockets;
wherein performing the operation comprises comparing the updated values of the one or more performance counters with values of one or more performance counters in one or more other processor cores of the given one of the multiple processor sockets on which respective software threads of the particular other application are executing.

10. The method of claim 1, further comprising:
performing, in response to a context switch between software threads of the applications executing on the given one of the multiple processor sockets, an operation to determine whether or not execution of the given application or execution of the particular other application should be migrated to a different of the multiple processor sockets;
wherein performing the operation comprises comparing the updated values of the one or more performance counters with values of one or more performance counters in one or more other processor cores of the given one of the multiple processor sockets on which respective software threads of the particular other application are executing.

11. The method of claim 1, wherein at least one of said determining that the application is to be executed on a given one of the multiple processor sockets or said determining that execution of the given application or execution of the particular other application is to be migrated to the different one of the multiple processor sockets is performed by a process or thread of an operating system executing on the computer or a resource-management-enabled parallel runtime system executing on the computer.

12. The method of claim 1,
wherein the method further comprises:
aggregating the updated values of the one or more performance counters to generate one or more performance metrics for the given application;
aggregating values of one or more performance counters in one or more other processor cores of the given one of the multiple processor sockets on which respective software threads of the particular other application are executing to generate one or more performance metrics for the particular other application;
aggregating values of one or more performance counters in one or more processor cores of the different one of the multiple processor sockets on which respective software threads of a third application are executing to generate one or more performance metrics for the third application; and
wherein said determining that execution of the given application or execution of the particular other application is to be migrated to the different one of the multiple processor sockets is dependent on one or more of: the one or more performance metrics for the given application, the one or more performance metrics for the particular other application, and the one or more performance metrics for the third application.

13. A system, comprising:
a plurality of collections of processor cores, each of which includes multiple processor cores and shared hardware resources, wherein the respective shared hardware resources of each of the plurality of collections of processor cores is not shared with others of the plurality of collections of processor cores, wherein each of the multiple processor cores includes a plurality of hardware performance counters, and wherein the multiple processor cores in each collection of processor cores share at least one hardware resource;

a memory comprising:

program instructions that when executed on one or more processor cores cause the one or more processor cores to implement a given one of the multiple applications; and additional program instructions that when executed on one or more other processor cores cause the one or more other processor cores to implement another one of the multiple applications;

wherein the program instructions and the additional program instructions are configured to execute on one or more processor cores of a given one of the collections of processor cores based at least in part on values of the plurality of hardware performance counters that predict performance of a pair of applications executed in parallel on the given one of the collections of processor cores;

wherein, when executed by a worker thread of the given application, a portion of the program instructions perform work on behalf of the given application and cause a respective value of each of one or more of the plurality of hardware performance counters of the one or more processor cores in the given one of the collections of processor cores to be updated;

wherein, when executed by a worker thread of the other application, a portion of the additional program instructions perform work on behalf of the other application and cause a respective value of each of one or more of the plurality of hardware performance counters of the one or more other processor cores in the given one of the collections of processor cores to be updated; and wherein a scheduler thread of the given application is configured to:

collect the updated values of the one or more of the plurality of hardware performance counters of the one or more processor cores and the one or more other processor cores in the given one of the collections of processor cores; and determine, prior to completing execution of the given application, and dependent on the collected updated values of the hardware performance counters, that execution of the given application or execution of the other application is to be migrated to one or more processor cores in a different one of the plurality of collections of processor cores.

14. The system of claim 13, wherein the memory further comprises a performance metrics table that is accessible by a respective software thread of each of multiple applications that is executing on one of the multiple processor cores in a respective one of the plurality of collections of processor cores;

wherein the performance metrics table stores performance counter information that was aggregated from data collected during execution of each of the multiple applications;

wherein the scheduler thread of the given application is further configured to:

aggregate the collected updated values of the performance counters to generate one or more performance metrics for the given application; and write, to the performance metrics table, data representing the one or more performance metrics for the given application;

wherein to determine that execution of the given application or execution of the other application is to be migrated to one or more processor cores in the different one of the plurality of collections of processor cores, the scheduler thread of the given application is configured to examine data stored in the performance metrics table that represents one or more performance metrics for the other application or data stored in the performance metrics table that represents one or more performance metrics for a third application that is executing on the different one of the plurality of collections of processor cores.

15. The system of claim 14, wherein to determine that execution of the given application is to be migrated to one or more processor cores in the different one of the plurality of collections of processor cores, the scheduler thread of the given application is configured to determine that the performance metrics for the given application and the performance metrics for the third application indicate that demand for shared resources of a given type is high for at most one of given application and the third application.

16. The system of claim 13, wherein the memory further comprises a schedule table that is accessible by a respective software thread of each of multiple applications that is executing on one of the multiple processor cores in a respective one of the plurality of collections of processor cores;

wherein the schedule table stores information indicating an assignment of a respective one of the plurality of collections of processor cores to each of the multiple applications; and wherein, in response to a determination that execution of the given application is to be migrated to one or more processor cores in the a different one of the plurality of collections of processor cores, the scheduler thread of the given application is further configured to:

update the information stored in the schedule table to indicate the assignment of the different one of the plurality of collections of processor cores to the given application; and initiate the continued execution of the given application on the different one of the plurality of collections of processor cores.

17. A non-transitory computer-readable storage medium storing program instructions that when executed on a multi-socket computer cause the multi-socket computer to implement an adaptive contention-aware thread scheduler;

wherein, for two applications scheduled to execute on two or more processor cores of a given processor socket of the multi-socket computer base at least in part on values of performance counters that predict performance of the two applications executed in parallel on the given processor socket of the multi-socket computer, the adaptive contention-aware thread scheduler is configured to:

collect, during execution of the two applications on the two or more processor cores of the given processor socket of the multi-socket computer, values of one or more of the hardware performance counters in each of the two or more processor cores of the given processor socket, wherein the values of the one or more of the hardware performance counters in each of the two or more processor cores indicate the extent to which the two applications compete for a resource of a given type on the given processor socket that is shared by the two applications;

determine, prior to completing execution of the two applications, and dependent on the collected values, that demand for the shared resource by both of the two applications is high; and select, in response to determining that demand for the shared resource by both of the two applications is high, a different one of the processor sockets of the multi-socket computer on which to migrate execution of one of the two applications, wherein to select the different one of the processor sockets, the adaptive contention-aware thread scheduler is configured to identify a processor socket on which an application with a low demand for resources of the given type is executing.

18. The non-transitory computer-readable storage medium of claim 17, wherein to collect the values of the one or more of the performance counters in each of the two or more processor cores of the given processor socket, the adaptive contention-aware thread scheduler is configured to call a function of a performance-focused library using an application programming interface that is defined for the performance-focused library.

19. The non-transitory computer-readable storage medium of claim 18, wherein the adaptive contention-aware thread scheduler is a component of an operating system executing on the multi-socket computer or is a component of a resource-management-enabled parallel runtime system executing on the multi-socket computer.

* * * * *

UNITED STATES PATENT AND TRADEMARK OFFICE
CERTIFICATE OF CORRECTION

PATENT NO. : 10,133,602 B2
APPLICATION NO. : 14/626754
DATED : November 20, 2018
INVENTOR(S) : Harris et al.

Page 1 of 1

It is certified that error appears in the above-identified patent and that said Letters Patent is hereby corrected as shown below:

In the Drawings

On sheet 2 of 11, in FIG. 2, under Reference Numeral 250, Line 6, delete "signigficantly" and insert -- significantly --, therefor.

In the Claims

In Column 33, Line 33, in Claim 6, after "method" insert -- of --.

In Column 36, Line 35, in Claim 16, delete "the a" and insert -- a --, therefor.

Signed and Sealed this
Fifth Day of November, 2019

Andrei Iancu
*Director of the United States Patent and Trademark Office*